(12) United States Patent
Hall

(10) Patent No.: US 8,088,420 B2
(45) Date of Patent: Jan. 3, 2012

(54) METHOD FOR OPTIMISING DIETS FOR COMPANION ANIMALS

(75) Inventor: Simon Reginald Hall, Leicestershire (GB)

(73) Assignee: Mars UK Limited, Slough, Berkshire (GB)

(*) Notice: Subject to any disclaimer, the term of this patent is extended or adjusted under 35 U.S.C. 154(b) by 1813 days.

(21) Appl. No.: 10/540,095

(22) PCT Filed: Dec. 19, 2003

(86) PCT No.: PCT/GB03/05604
§ 371 (c)(1),
(2), (4) Date: Dec. 30, 2005

(87) PCT Pub. No.: WO2004/056197
PCT Pub. Date: Jul. 8, 2004

(65) Prior Publication Data
US 2006/0127529 A1    Jun. 15, 2006

(30) Foreign Application Priority Data

Dec. 20, 2002 (GB) .................................. 0229839.6

(51) Int. Cl.
*A23K 1/18* (2006.01)
(52) U.S. Cl. ............ 426/2; 426/656; 426/658; 426/601; 426/805
(58) Field of Classification Search ............... 426/2, 805, 426/601, 656, 658
See application file for complete search history.

(56) References Cited

U.S. PATENT DOCUMENTS 6,410,063 B1 * 6/2002 Jewell et al. .................. 426/2
2001/0048955 A1 * 12/2001 Foreman et al. .............. 426/2

FOREIGN PATENT DOCUMENTS

| WO | WO-01/97605 | 12/2001 |
| WO | WO-01/97630 | 12/2001 |
| WO | WO-03/008973 | 1/2003 |

OTHER PUBLICATIONS

Rice, "The Dog Handbook", pp. 48-49, published by Barron's Educational Series, 1999.*
Romsos et al., JAVMA, vol. 182(1), pp. 41-43, 1983.*
Serpell, "The domestic dog", published by Cambridge University Press, pp. 104-106, 1995.*
Bradshaw, "Sensory and experiential factors in the design of foods for domestic dogs and cats," *Proceedings of the Nutrition Society*, 50: 99-106, 1991.
Lester et al., "Macronutrient Utilization in Cats Fed Low and High Fat Diets," *FASEB Journal*, 11(3): A372, 1997 [abstract].
Wills, "Basic Principles of Nutrition and Feeding," "Bsava Manual of Companion Animal Nutrition & Feeding," British Small Animal Veterinary Association, Shurdington, Cheltenham, UK, 1996.

* cited by examiner

*Primary Examiner* — C. Sayala
(74) *Attorney, Agent, or Firm* — Fulbright & Jaworski L.L.P.

(57) ABSTRACT

The present invention relates to a method for determining the optimum macronutrient content of a diet for an individual companion animal and for optimised diets determined according to such a method.

7 Claims, 20 Drawing Sheets

METHOD FOR OPTIMISING DIETS FOR COMPANION ANIMALS

CROSS-REFERENCE TO RELATED APPLICATIONS

This application is a national stage filing of PCT/GB2003/005604 filed Dec. 19, 2003 claiming priority to GB 0229839.6 filed Dec. 20, 2002.

TECHNICAL FIELD

The present invention relates to a method for determining the optimum macronutrient content of a diet for an individual companion animal and for optimised diets determined according to such a method.

BACKGROUND OF THE INVENTION

This invention is based on the observation that when consuming food, companion animals are attempting to reach a target intake of each of the three macronutrients (protein, carbohydrate, fat) within a given time period. The invention describes a methodology for determining the target values of protein, fat and carbohydrate consumption for an individual animal. Once determined, a customised foodstuff or dietary regime equivalent to the target macronutrient ratio can be formulated for each individual animal.

This invention addresses the provision of palatable foods for companion animals, while also offering health benefits to the animal and increased acceptance/increased enjoyment in feeding.

Historically, the majority of research work on "palatability" (the relative acceptance of and preference for different foods) has concentrated on optimising the organoleptical qualities of the food. The assumption has been that the acceptability of a food and preference for one food over another are primarily driven by the taste and texture of the food. The assumption has been that as long as the nutrient content of foods exceed the minimum requirements of the pet the animal will not discriminate between diets of differing nutrient profile unless there is an indirect effect on the taste or texture of the diets. This invention is based on data that demonstrates that this is not the case. When given the opportunity to do so, by provision of foods of different macronutrient contents, the companion animals will select between these foods so as to regulate their consumption of each macronutrient in order to reach an optimum target.

The present invention has identified that there is a limit to the amount of carbohydrate that companion animals are willing to consume. In order not to do so, they are prepared to sacrifice their calorie and/or protein intake. However, the short and long-term effects of sacrificing macronutrient intake from an animal's diet are not beneficial.

Different species and breeds of companion animal will have different optimum macronutrient content for their diets. Furthermore, an individual companion animal is likely to have a changing optimum macronutrient content of their diet, depending on factors such as life stage, sex, sexual activity, gestation, lactation, illness, seasonal variation, environment, stress levels etc.

Thus, it is important to be able to easily determine and easily adapt the macronutrient content of an individual animal's diet.

BRIEF SUMMARY OF THE INVENTION

A first aspect of the present invention provides a method for determining the optimum macronutrient content of a diet for an individual animal, the method comprising:

providing to said animal food compositions which provide an enriched source of fat, protein and/or carbohydrate, such that said animal can select and consume preferred quantities of said food compositions in order to achieve an optimum consumption of fat, protein and carbohydrate;

allowing said animal to consume preferred quantities of fat, protein and carbohydrate from said compositions;

and determining, from the consumed amount of fat, protein and carbohydrate from said compositions, the optimum macronutrient content of a diet for said individual animal.

According to the present invention, macronutrients are fat, protein and carbohydrate.

The first aspect of the present invention includes allowing an animal to consume unlimited amounts of fat, protein and carbohydrate from said compositions. Provision of unlimited amounts of said compositions allows the animal to select the preferred amount of fat, protein and carbohydrate which provides the optimum macronutrient content for its diet.

In order for the animal to select the optimum macronutrient content from unlimited amounts of said compositions, the fat, protein and carbohydrate must be provided in a format or formats such that the animal can select preferred quantities thereof. Accordingly, the sources of fat, protein and carbohydrate are preferably provided in two or more different compositions, each composition having differing levels of at least protein and fat.

Preferably, the compositions of the invention are in the form of a foodstuff. Compositions of different formats can be used to provide the fat, protein and carbohydrate to the animal. However, in practice, processed foodstuffs which are typically provided to companion animals and which can be used according to the present invention may be most suitable for the present invention. Such foodstuffs are likely to provide a source of at least two macronutrients. For example, a composition may comprise both fat and carbohydrate or both protein and carbohydrate. Some compositions may comprise levels of fat, protein and carbohydrate. Whatever the levels of the macronutrients in the compositions, they must be provided such that the animal can select a preferred individual and total macronutrient content by consuming differing amounts of the compositions. If it is necessary or appropriate to determine, theoretically, the macronutrient content of the diet according to the first aspect of the invention, it is necessary to know the levels of macronutrient content of the compositions. However, the method can be carried out without precise knowledge of such details by providing the unlimited amounts of fat, protein and carbohydrate. The animal can then simply consume its optimum diet, for each meal. Alternatively, the method according to the first aspect can be carried out, followed by noting the quantities of each composition which the animal consumes. The determined quantities of the macronutrients can then be continually provided to the animal to supply the optimum macronutrient content for said animal. In this embodiment, there is no necessity to know the macronutrient content of the compositions. It is only necessary to have compositions with the same macronutrient content available for subsequent feeding.

The compositions themselves may be a food product in their own right. Each may be a dry, semi-moist or a moist (wet) product. Wet food includes food that has a moisture content of 70% to 90% and is usually sold in containers such as tins, pouches and/or trays. Dry food includes food having a similar composition but with 5% to 15% moisture, often presented as small biscuit—like kibbles. Semi-moist food includes food having a moisture content of from above 15% up to 70%. The amount of moisture in any product may influence the type of packaging that can be used or is required. The food product, of any moisture level may be ready-to-eat.

The compositions which provide the macronutrients according to the present invention encompass any product that a pet consumes in its diet. Thus, the compositions may include the standard food products as well as pet food snacks (for example snack bars, cereal bars, snacks, biscuits and sweet products). The composition may be a cooked product. It may incorporate meat or animal-derived material (such as beef, chicken, turkey, lamb, fish, blood plasma, marrowbone, etc or one or more thereof). Alternatively the composition may be meat-free (preferably including a meat substitute such as soya, maize gluten or a soya product) in order to provide protein. The composition may contain additional protein sources such as soya protein concentrate, milk, protein, gluten, etc. The composition may also contain starch, such as one or more grains (e.g. wheat, corn, rice, oats, barley, etc) or may be starch-free. The composition may incorporate or be a gelatinised starch matrix. The composition may incorporate one or more types of fibre such as sugar beet pulp, chicory pulp, chicory, coconut endosperm fibre, wheat fibre etc. Dairy products, such as those incorporating a cream or a cheese sauce, may be suitable. The composition can also be newly designed products currently not available. The most suitable composition may be a pet food product as described herein which is sold as a pet food, in particular a pet food for a domestic dog or a domestic cat. It may be convenient to provide the compositions in a dry format, such as dried ready-to-eat cereal products (often referred to as kibbles).

Accordingly, the sources of fat, protein and carbohydrate could be provided by three different dry kibbles, for example as follows:—

|  | PER:FER:CER | PME (kcal/100 g) |
| --- | --- | --- |
| Carbohydrate enriched | 26%/22%/52% | 344 |
| Protein enriched | 51%/23%/26% | 336 |
| Fat enriched | 27%/45%/28% | 404 | wherein
PER=protein:total energy ratio (i.e. the percentage of the total energy content coming from protein)
FER=fat:total energy ratio
CER=carbohydrate:total energy ratio
PME=predicted metabolisable energy (i.e. energy content expected based on its composition).

The compositions in the method according to the first aspect of the invention may be nutritionally complete either alone or in combination and as such, the practice of the method may provide a suitable nutritionally complete diet for the companion animal.

Preferably, the method comprises a learning phase. During such a learning phase, the animal is preferably provided with a single diet composition at any one feeding experience. Accordingly, the animal has no other choice at that feeding experience. Each diet composition comprises a foodstuff which is enriched in respect of one macronutrient.

The length of the learning phase depends on a number of factors, including how many feeding experiences the animal has during a day/week etc and how much length of time is desired or available for the animal to learn.

Accordingly, an animal could go through the learning phase in one day, by having a single diet composition, each enriched with one macronutrient at three feeding experiences.

Preferably, only one diet is available to the animal in any one day. In such a case, an animal goes through the learning phase in 3 days. During each of the 3 days, only one diet composition is available to the animal. That is, on the first day the animal receives a diet composition enriched in, for example, fat. On the second day, the animal receives a diet composition enriched in either protein or carbohydrate. On the third day, the animal receives a diet composition enriched in the remaining macronutrient.

The diet compositions of the learning phase may be the same as the compositions of the method of the invention.

Most preferably, the learning phase comprises a cycle of one diet a day for 3 days. In this case, the learning phase may comprise 1, 2, 3, 4, 5, 6, 7, 8, 9 or 10 cycles. Thus the learning phase may comprise 3, 6, 9, 12, 15, 18, 21, 24, 27 or 30 days.

During the learning phase, the animal should not be able to consume any other food. However, the animal should have unlimited access to fresh water.

Accordingly, the method of the first aspect of the invention may be preceded by a learning phase whereby for at least three feeding experiences, the animal receives a single composition which is enriched in respect of each macronutrient, respectively. A feeding experience may be a period of one day. Any learning phase preferably immediately precedes the method of the first aspect of the invention. There is no need to note quantities of any consumption during the learning phase.

The method may further comprise a phase before the learning phase, where the animal familiarizes itself with the diets and where the owner/carer/vet/monitor can note the animal's naïve self-selection. Such a period may be termed the naïve self-selection/preference phase, or naïve self-selection phase.

Such a naïve self-selection phase may be carried out from between 1 to 14 days, particularly from 1 to 7 days. In such a phase, the animal is provided with a limited quantity of all compositions which are to be used in the method of the invention.

Accordingly, the method of the first aspect of the invention may be preceded by a naïve self-selection phase, whereby for at least one feeding experience, the animal is provided with the compositions that will be provided according to the method of the invention. A feeding experience may be a period of one day. Preferably, such a naïve self-selection phase is before any learning phase (most preferably immediately preceding it).

In the method according to the first aspect of the invention, the composition which provides an enriched source of fat preferably comprises from 20 to 90% fat on a fat:energy ratio basis. Preferably, such a composition may comprise from 50 to 75% fat on a fat:energy ratio basis.

The composition which provides the enriched source of protein preferably comprises from 18 to 90% protein on a protein:energy ratio. Preferably such a composition comprises from 50 to 75% protein on a protein:energy ratio.

The composition which provides the enriched source of carbohydrate preferably comprises from 20 to 90% carbohydrate on a carbohydrate:energy ratio. Preferably, such a composition comprises from 25 to 50% carbohydrate on a carbohydrate:energy ratio.

All ratios described above are determined as the number of the calories coming from the fat, protein or carbohydrates as a % of the total calories in the composition.

The companion animals according to the present invention are preferably cats, particularly the domestic cat (*Felis domesticus*), dogs, preferably domestic dogs (*Canis domesticus*), equine animals, such as horses, as well as fish and birds.

The method enables an individual animal to select a diet of a particular macronutrient content. Such a selection can be represented by the triangle of FIG. 1 (representing dry diets of varying macronutrient profiles). The method allows the animal to regulate the total intake of each macronutrient. It allows the animal to regulate on fat intake in carbohydrate free diets. It allows the animal to regulate on carbohydrate intake in carbohydrate-containing diets. All of these have been shown to be desired in animals.

The method of the invention may be carried out over a period of one meal occasion, e.g. 2-4 hours, one day (24 hours), 36 hours or up to a week.

The experimental work showed a preferred protein, fat and carbohydrate intake (a target). The effects are large enough to affect the total daily intake at the expense of caloric intake. Further, the effects are large enough to affect product selection in a choice situation.

The step of determining the optimum macronutrient content of a diet for an individual animal, from the amounts of said compositions, can be carried out in a number of ways.

For example, it may simply be a case of determining the amount of each composition consumed and providing such quantities of macronutrients in a diet or food with equivalent levels.

A helpful tool may be a table or chart which indicates an optimum diet or foodstuff depending on the quantities of each of the compositions consumed by the animal. Alternatively, the quantities of each composition consumed may relate to a figure or number which can be used to obtain an optimum diet by use, for example, of a vending machine system. Such a system can dispense an optimum diet either as a single dietary foodstuff, or as two or more components which are to be available to the animal at the same time.

This step of determination can be carried out through an electronic interface, to an electronic database, thus providing information on a customised diet or a customised diet itself.

A second aspect of the present invention provides an optimised macronutrient diet, for an individual animal, determined by a method according to the first aspect of the invention.

Such an optimised macronutrient diet may comprise a single foodstuff, or two or more differing foodstuffs. The single foodstuff or two or more differing foodstuffs may be provided to the animal at the same time (i.e. a single meal occasion) or at different times over a period of 24, 36, 48 hours or up to a week. Such a foodstuff, or foodstuffs, may comprise one or more of the compositions hereinbefore described in relation to the first aspect of the invention.

All preferred features of the first aspect of the invention also apply to the second.

The present invention provides advantages. It offers an optimum diet for an individual pet or companion animal based on that animal's metabolic needs as opposed to transitory sensory preferences.

The invention provides a solution to the problem of providing palatable foods for companion animals, as well as offering benefits to the companion animal of increased acceptance/increased enjoyment in feeding. Furthermore the invention provides an increased enjoyment/satisfaction by the carer/owner of the animal.

The enjoyment of the animal and/or increase in acceptance/palatability can be determined, for example, by one or more of the following:—
an increase in the quantity of foods consumes;
a decrease in the frequency of refusals to eat over an extended period of time;
an increase in enthusiasm during the meal as indicated by a reduction in the time taken to start a meal and/or an increase in the speed at which food is consumed;
the animal chooses the food over another food;
the animal refuses other foods;
or by any other behaviour by the animal which is taken by the owner/carer to be an indication of enjoyment of the food, for example:
the animal rubs around the owner/carer when serving the food;
the animal is inactive/rests or sleeps after eating;
the animal licks itself or washes after eating.

In addition to these benefits, providing a food which matches the optimum macronutrient ratio for a particular companion animal offers health benefits to the animal, including maintenance of a healthy weight and/or body mass index, obesity prevention, improved immune function, reinforcing the immune system, reduced oxidative damage and DNA damage, ability to cope with oxidative stress/challenge, improved life expectancy, improved metabolic rate and function, improved gut function and digestibility, reproductive efficiency, improved behaviour, cognitive function and improved disease resistance.

BRIEF DESCRIPTION OF THE DRAWINGS

The invention is described with reference to the figures, in which.

After monadic training period (days 65 to 71), the same cats consistently rejected low protein/high fat food regardless of flavour added.

Figure 3:
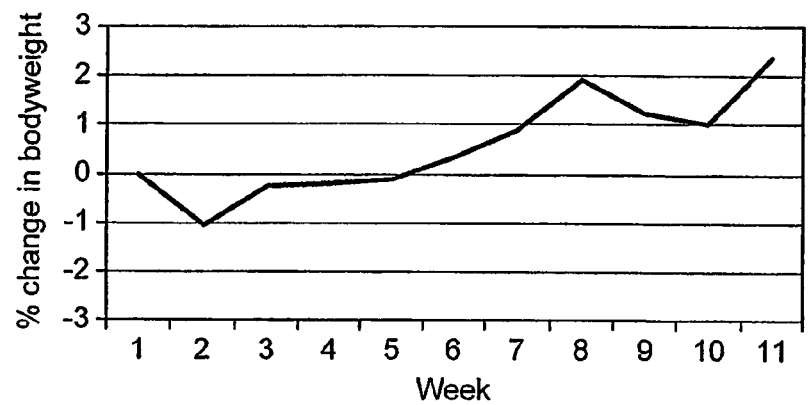

FIG. 3 shows the percentage change in bodyweight over time in weeks.

Figure 4:
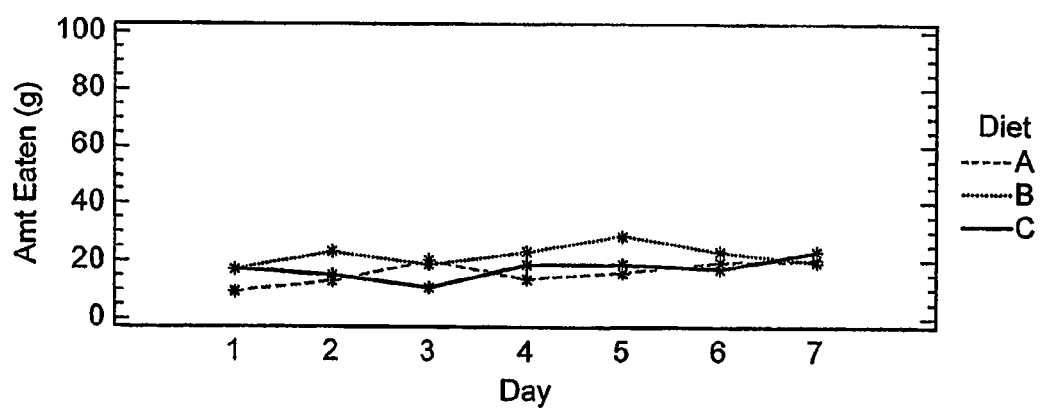

FIG. 4 shows the amount eaten (g) versus time in days.

Figure 5:
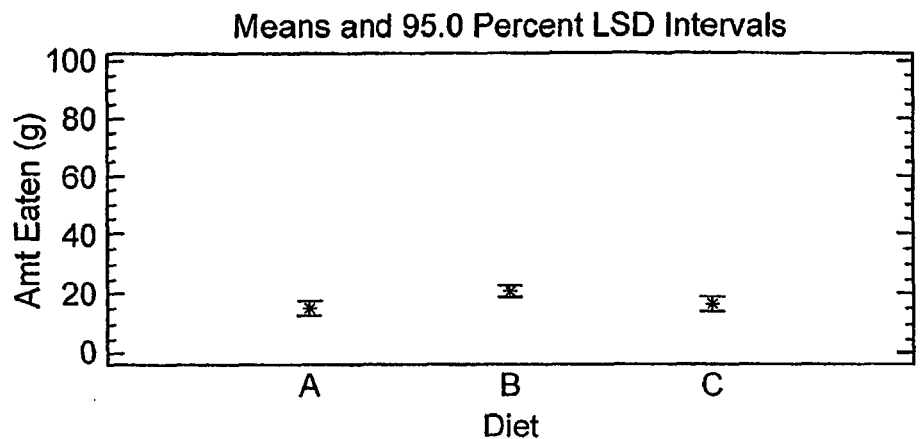

FIG. 5 shows the amount eaten (g) of three different diets.

Figure 6:
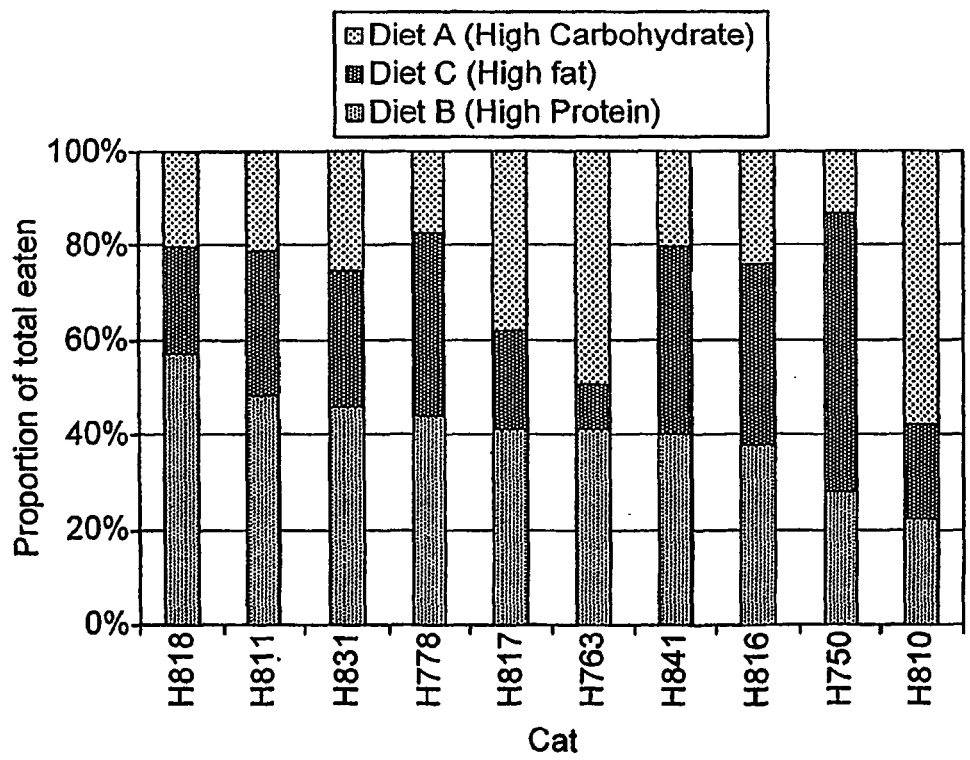

FIG. 6 shows the proportion of total eaten of each diet for individual cats during naïve self-selection.

Figure 7:
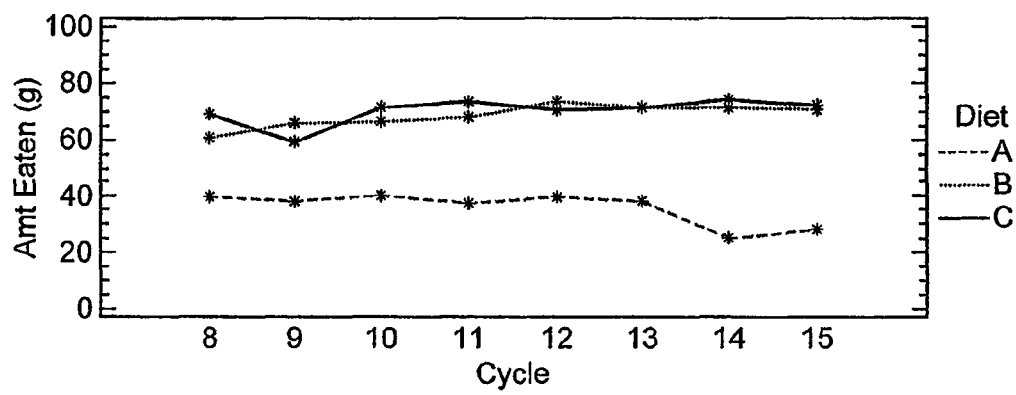

FIG. 7 shows the daily mean intake eaten (g), averaged over all cats, for each diet during each of the eight 3-day cycles.

Figure 8:
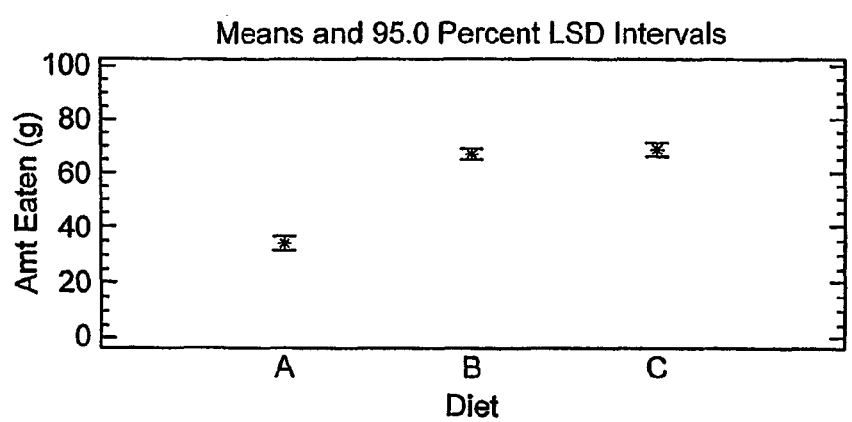

FIG. 8 shows the daily mean intake eaten (g) for three diets, averaged over cats and all cycles for each diet during the learning phase.

Figure 9:
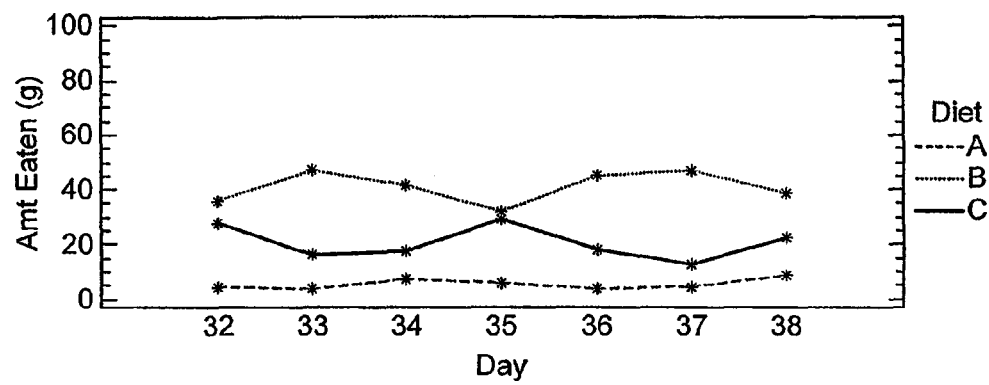

FIG. 9 shows the daily mean intake eaten (g) averaged for all cats, for each diet during experienced self-selection.

Figure 10:
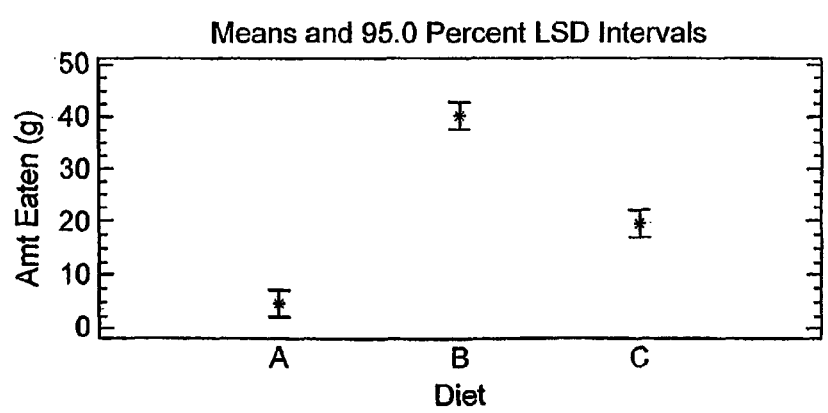

FIG. 10 shows the mean daily intake eaten (g) for all three diets, averaged all cats and all days during experienced self-selection.

Figure 11:
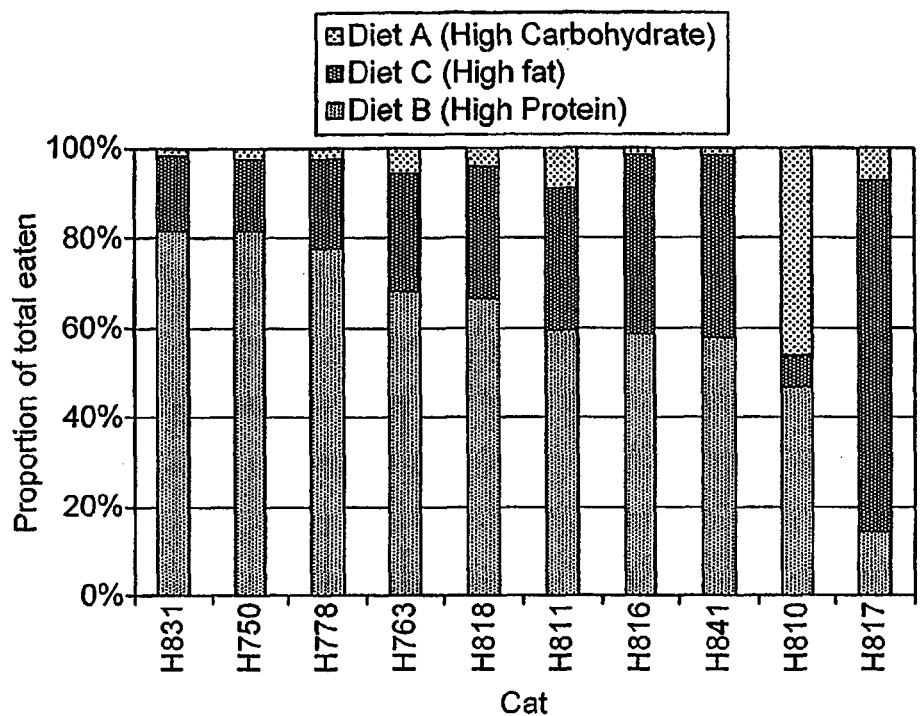

FIG. 11 shows the proportion of total eaten for each diet, averaged over all days, for each cat during experienced self-selection.

Figure 12:
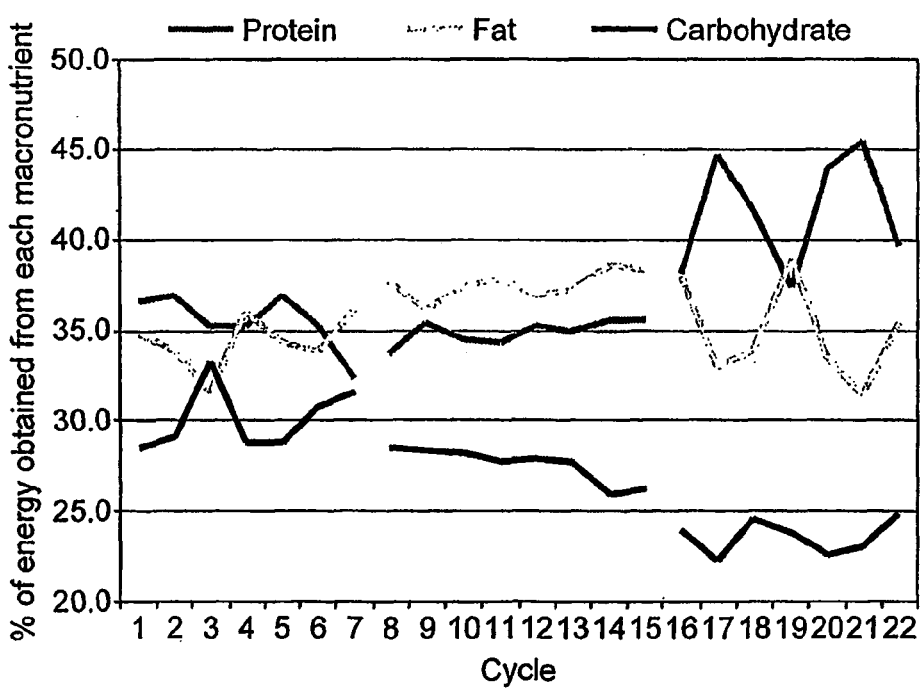

FIG. 12 shows the mean daily percentage of energy obtained from each macronutrient during the trial.

Figure 13:
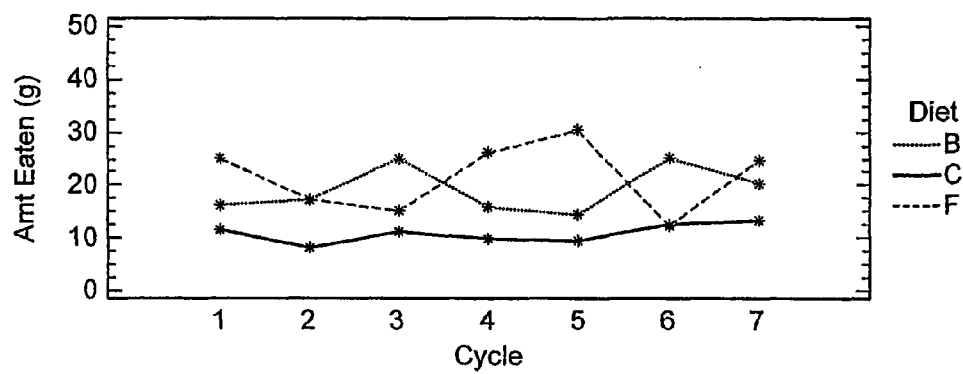

FIG. 13 shows the daily mean food intake, averaged over all cats for each diet during the naïve self-selection phase.

Figure 14:
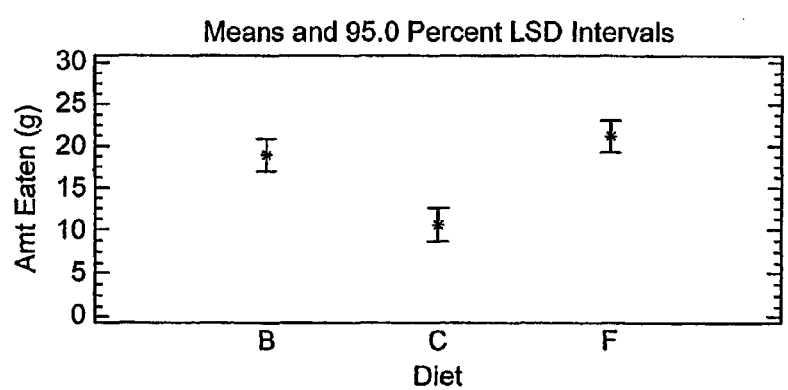

FIG. 14 shows the mean intake eaten (g), averaged over all cats and all days, for each diet during naïve self-selection.

Figure 15:
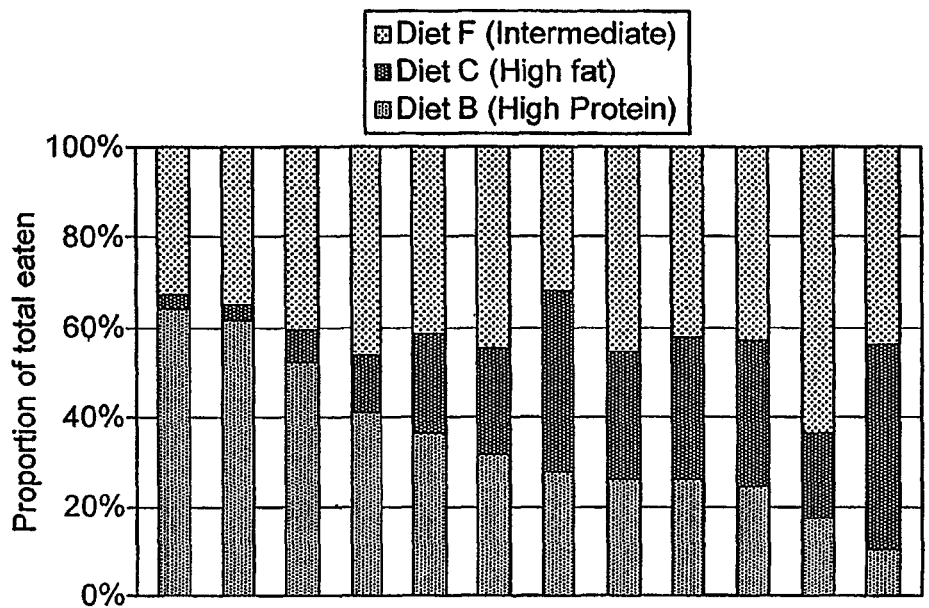

FIG. 15 shows the proportion of total eaten averaged over all days, for each cat during the naïve self-selection phase.

Figure 16:
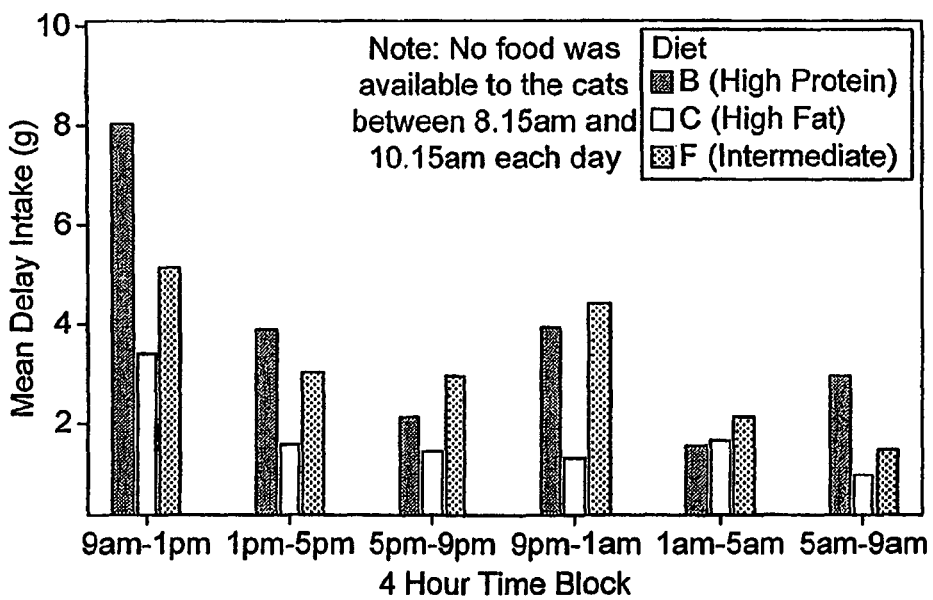

FIG. 16 shows the mean daily intake (g) pattern for the three diets throughout the course of the day in naïve self-selection.

Figure 17:
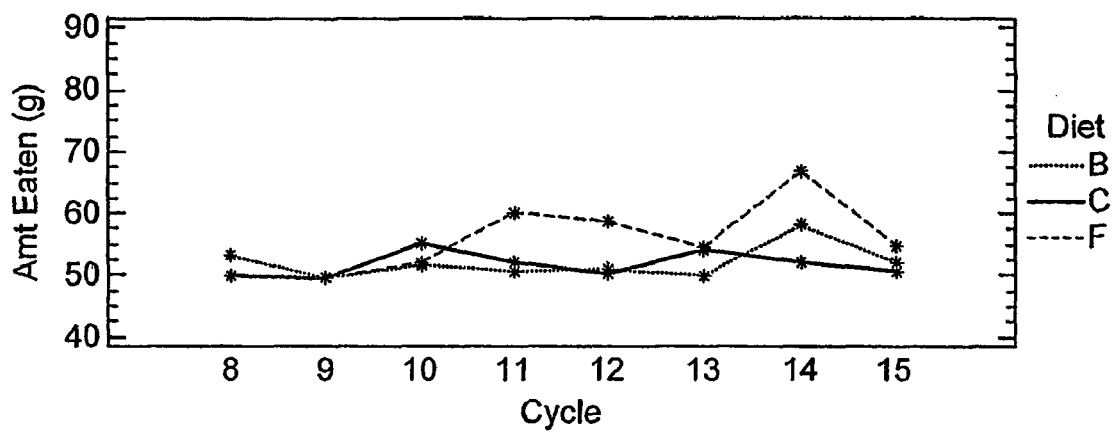

FIG. 17 shows the daily mean food intake (g), averaged over all cats, for each diet during each of the eight 3-day cycles.

Figure 18:
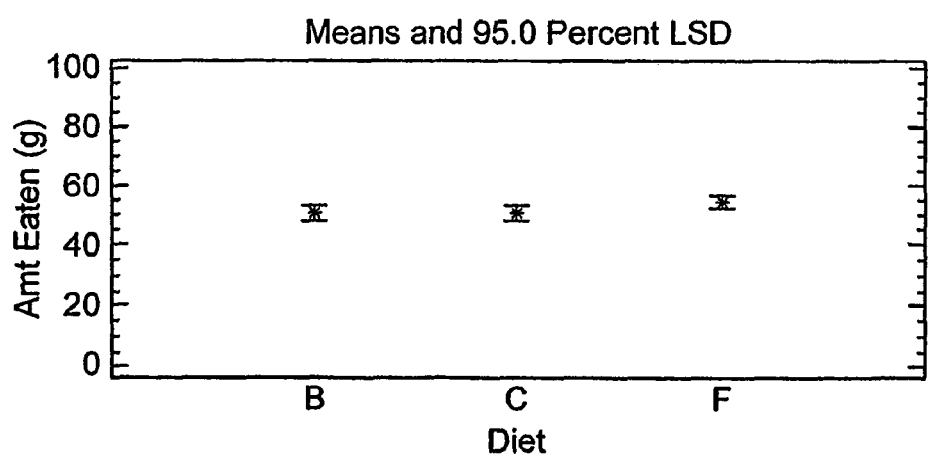

FIG. 18 shows the daily mean food intake (g), averaged for the cats and all cycles, for each diet during the learning phase.

Figure 19:
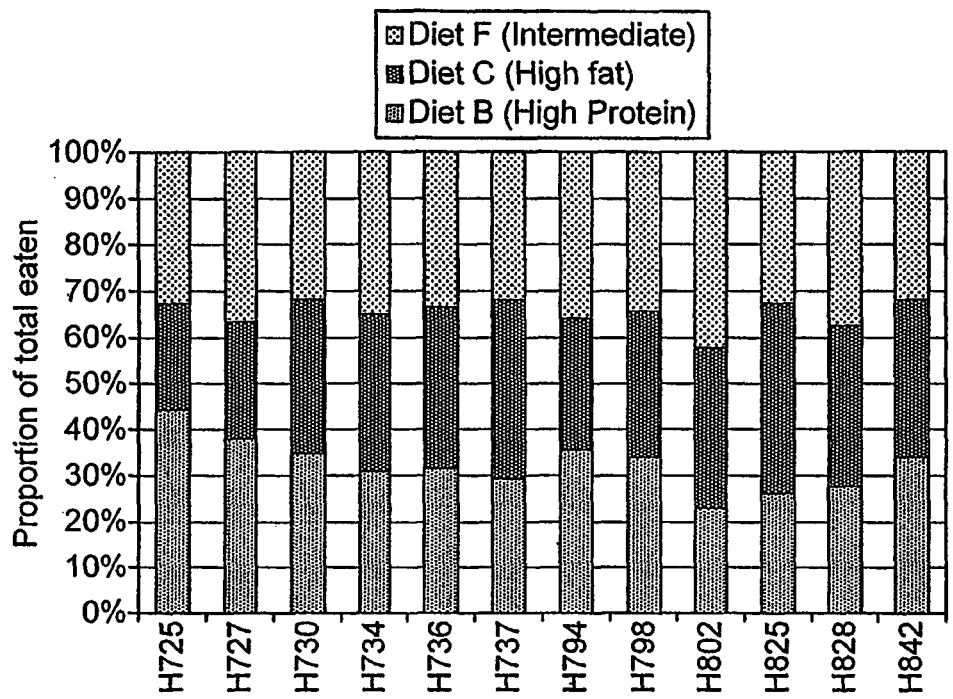

FIG. 19 shows the proportion of total eaten averaged over all days, for each cat in the learning phase.

Figure 20:
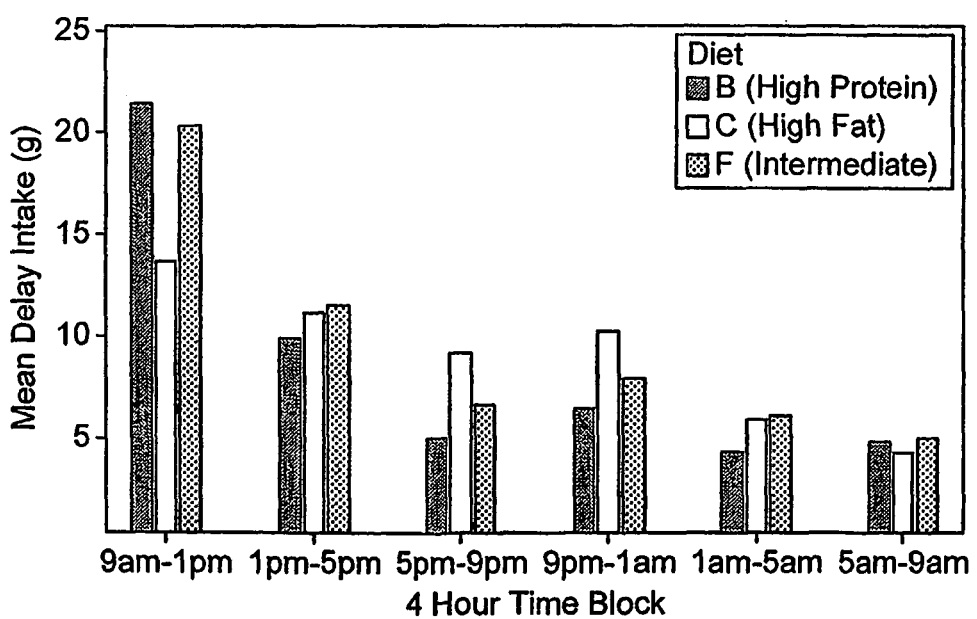

FIG. 20 shows the mean daily food intake (g) pattern for the three diets throughout the course of the day in the learning phase.

Figure 21:
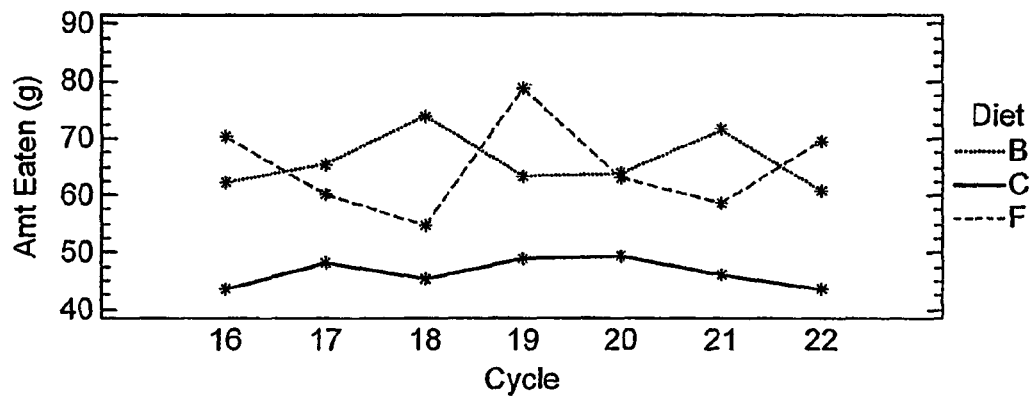

FIG. 21 shows the daily mean food intake (g), averaged over all cats, for each diet during experienced self-selection phase.

Figure 22:
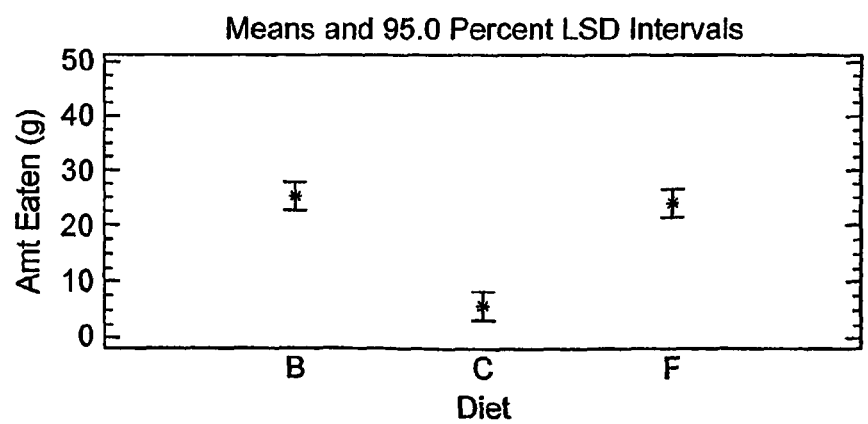

FIG. 22 shows the daily mean food intake, averaged over all cats and all days for each diet during the experienced self-selection phase.

Figure 23:
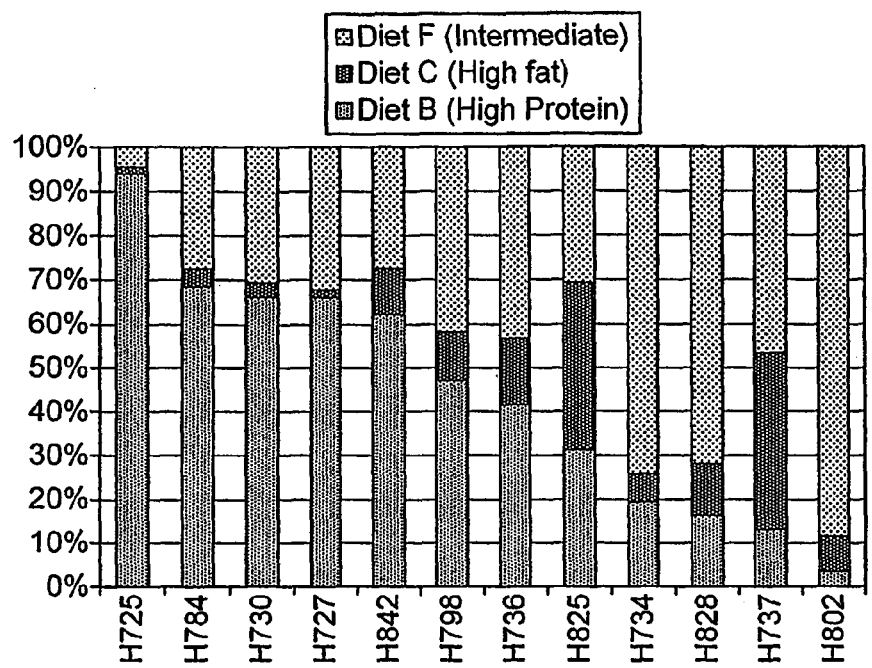

FIG. 23 shows the amount of each diet consumed as a proportion of the total food eaten, averaged over all days, for each cat during the experienced self-selection phase.

Figure 24:
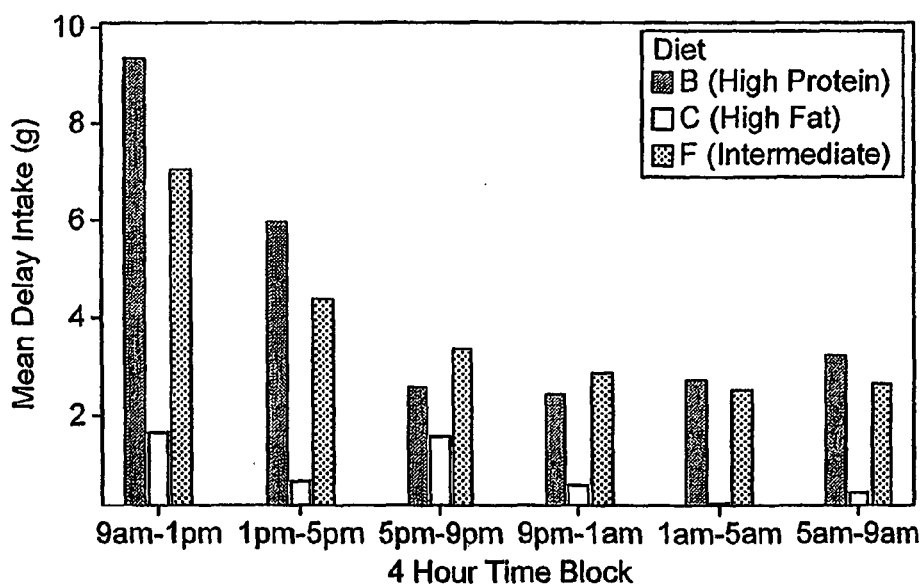

FIG. 24 shows the mean daily food intake (g) pattern of the three diets throughout the course of the day in the experienced self-selection phase.

Figure 25:
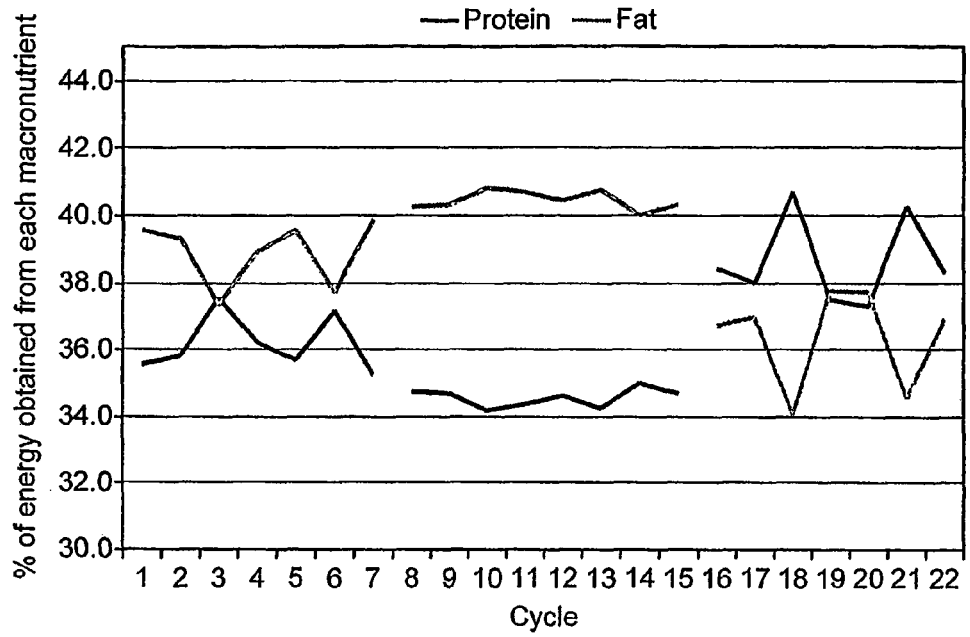

FIG. 25 shows the mean daily P/FER intake during the trial.

Figure 26:
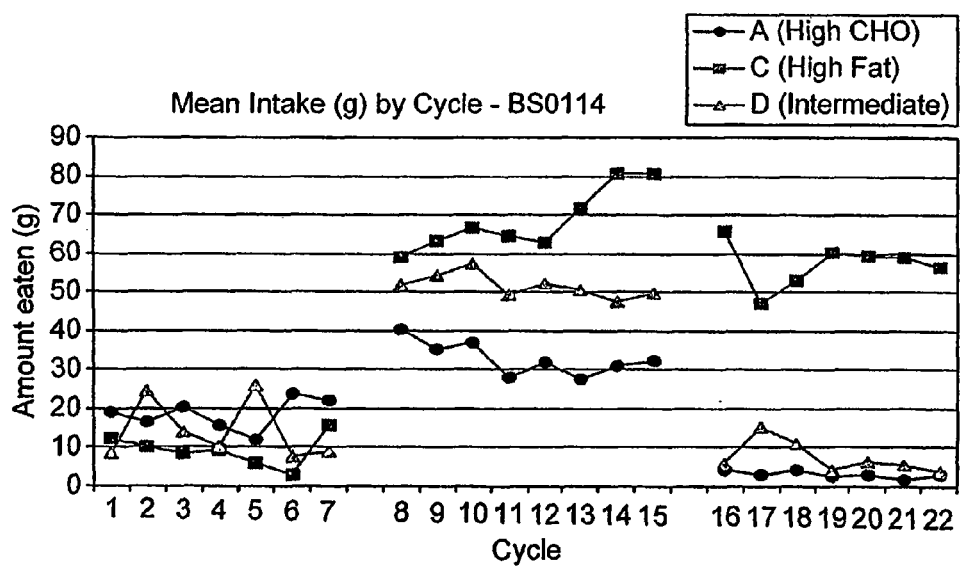

FIG. 26 shows the mean intakes (g) throughout the trial.

Figure 27:
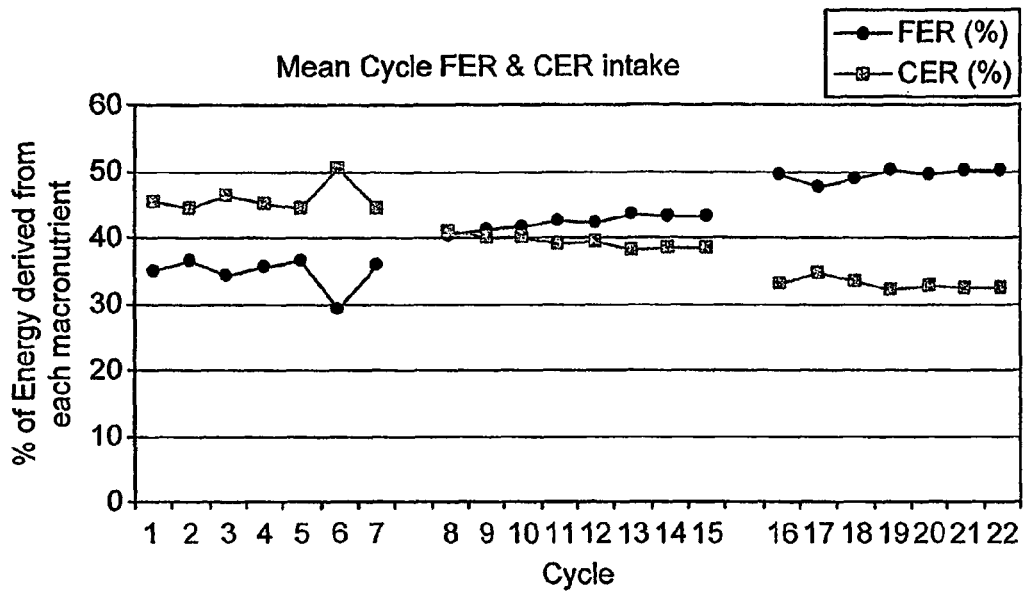

FIG. 27 shows the percentage of energy derived from each macronutrient during the trial.

Figure 28:
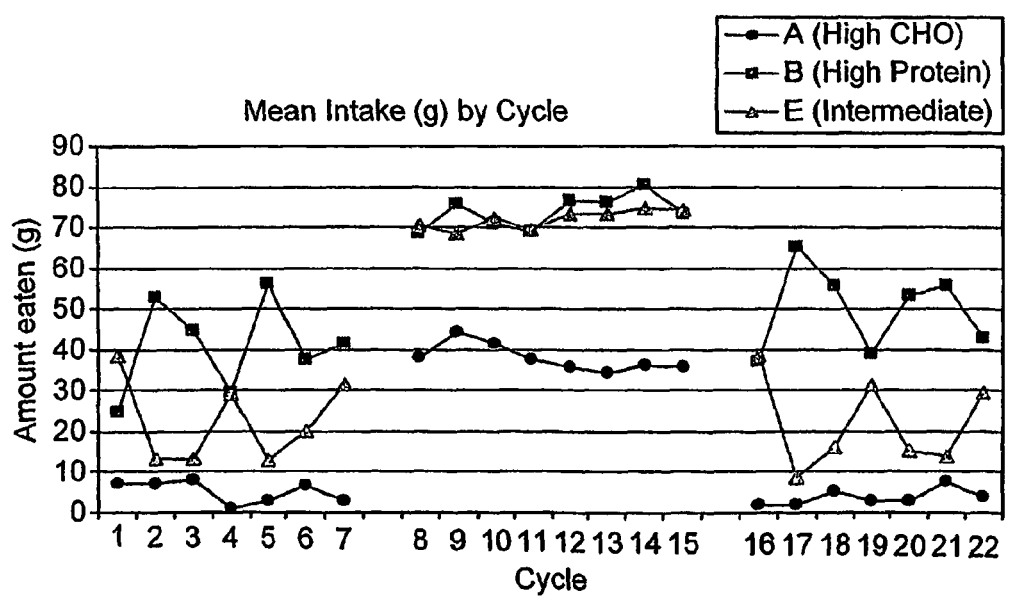

FIG. 28 shows the mean intakes (g) throughout the trial.

Figure 29:
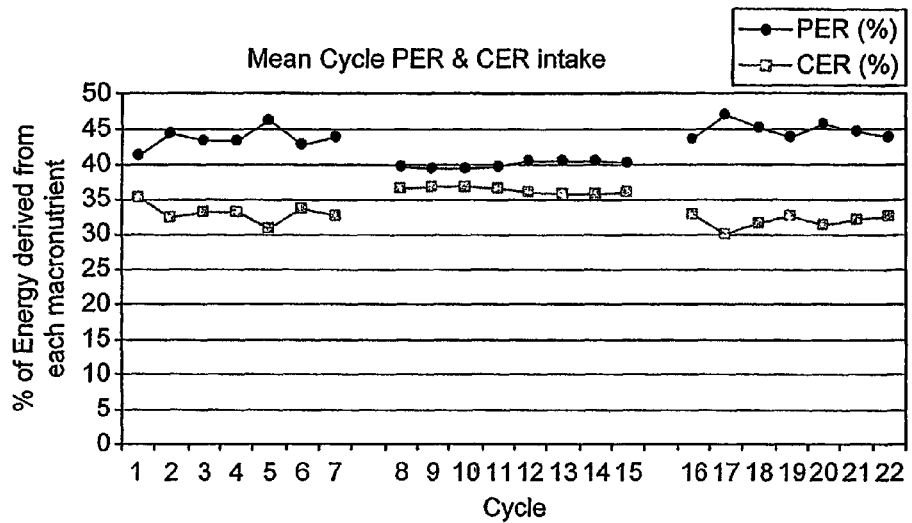

FIG. 29 shows the percentage of energy derived from each macronutrient during the trial.

Figure 30:
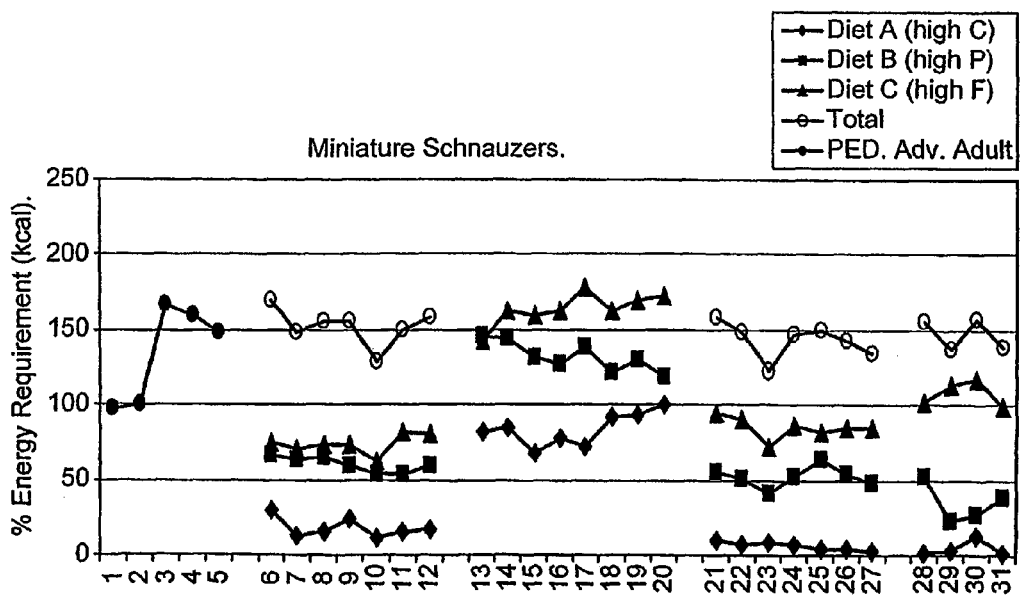

FIG. 30 shows the % energy requirement (kcal) over the trial for miniature Schnauzers.

Figure 31:
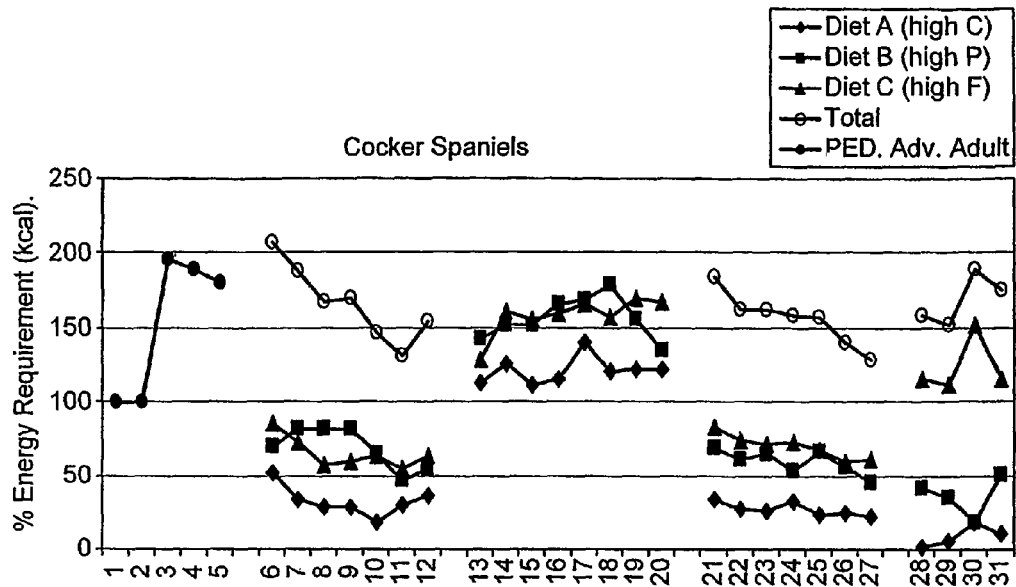

FIG. 31 shows the % energy requirement (kcal) for the trial for Cocker Spaniels.

Figure 32:
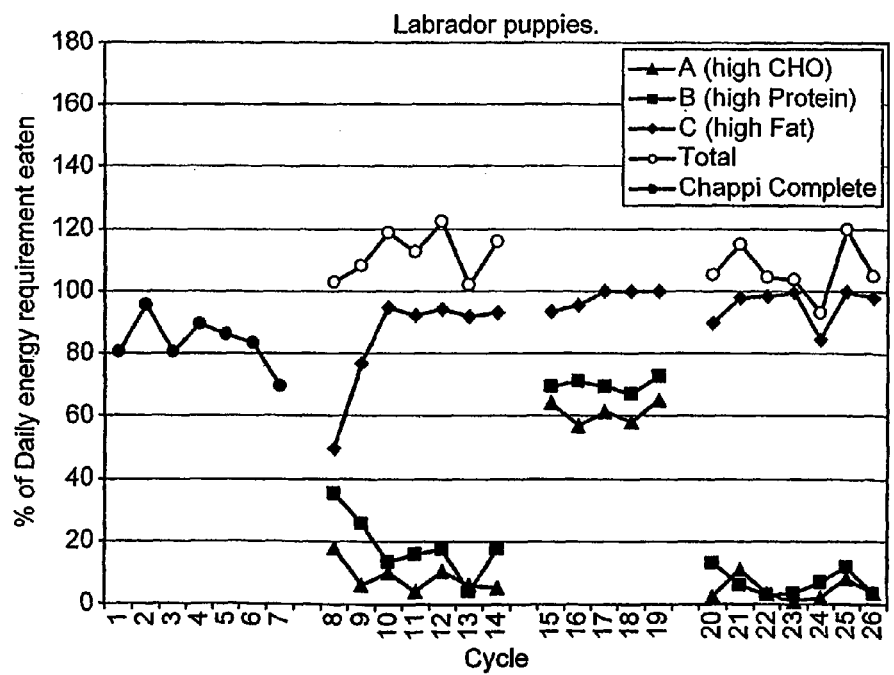

FIG. 32 shows the % of daily energy requirement eaten over the trial for Labrador puppies.

Figure 33:
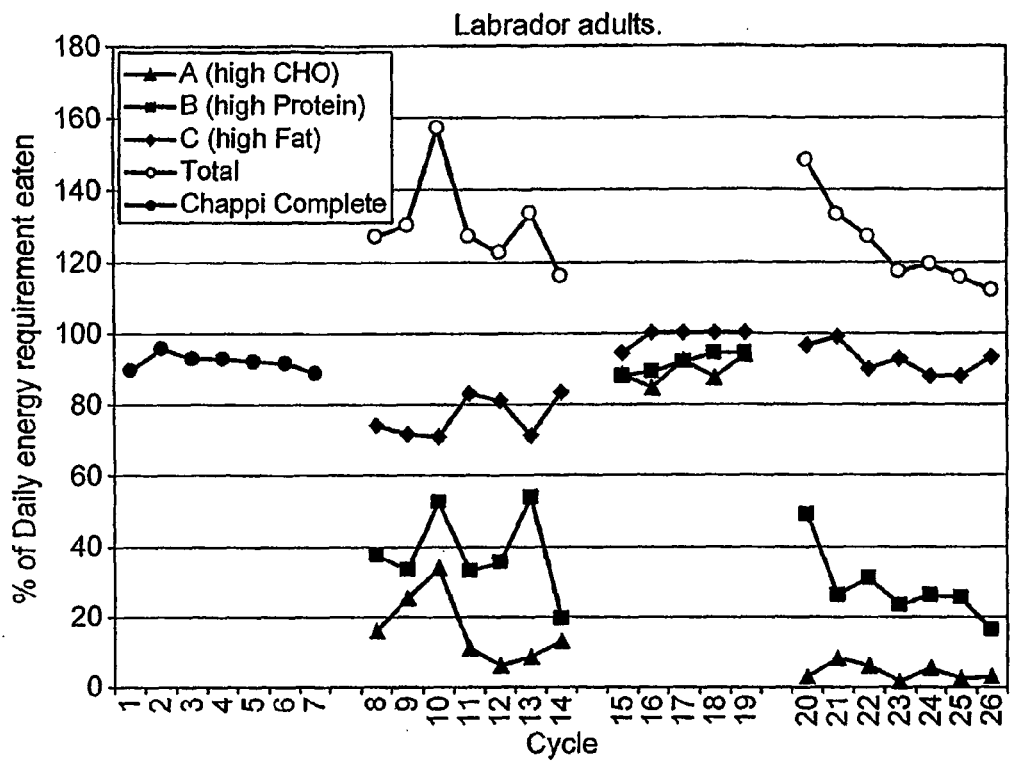

FIG. 33 shows the % of daily energy requirement eaten over the trial for Labrador adults.

Figure 34:
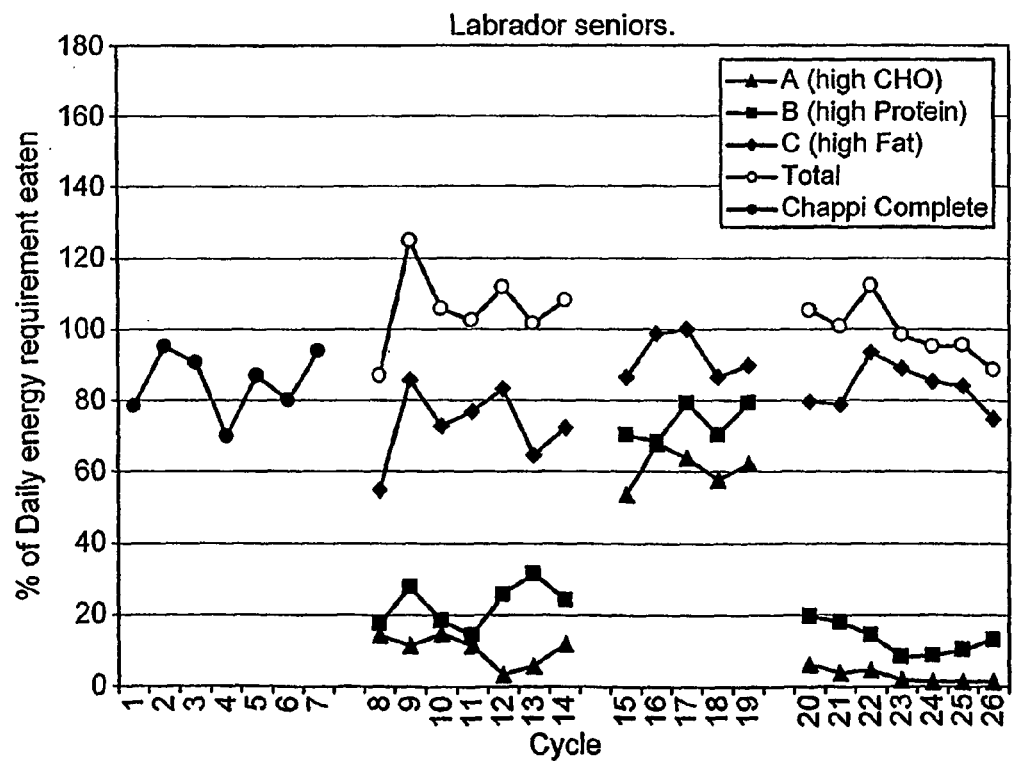

FIG. 34 shows the % of daily energy requirement eaten over the trial for Labrador seniors.

Figure 35:
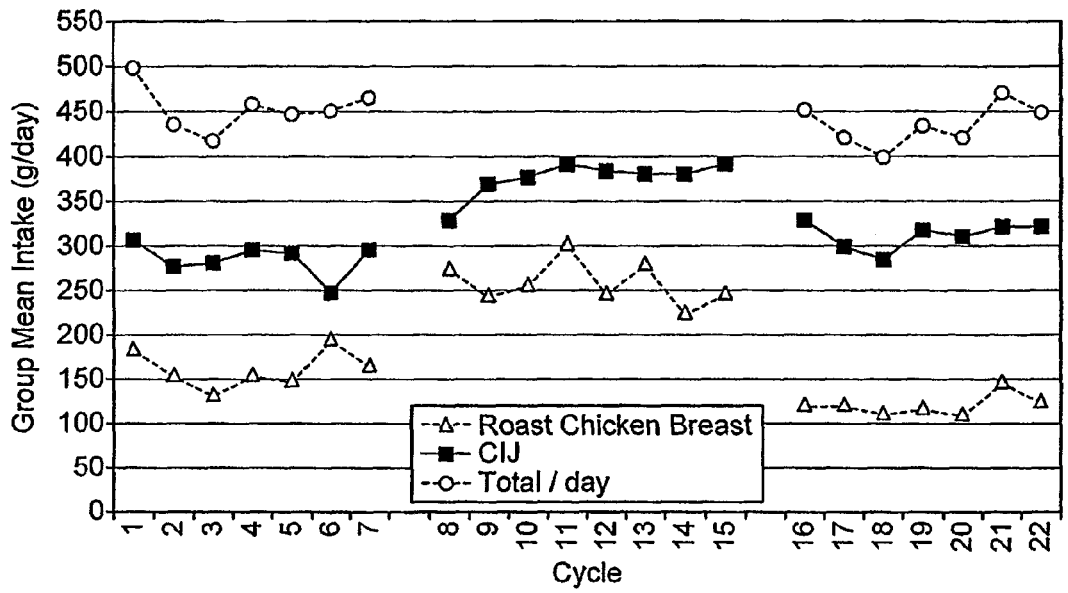

FIG. 35 shows the group mean intake (g/day) in the three phases.

Figure 36:
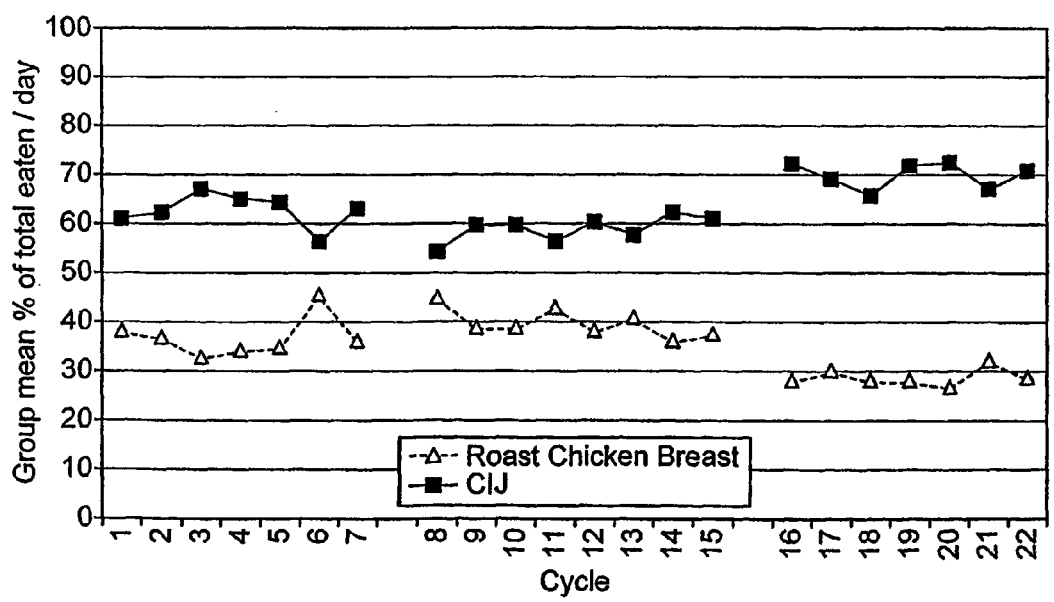

FIG. 36 shows the group mean % of total eaten per day over the three phases.

Figure 37:
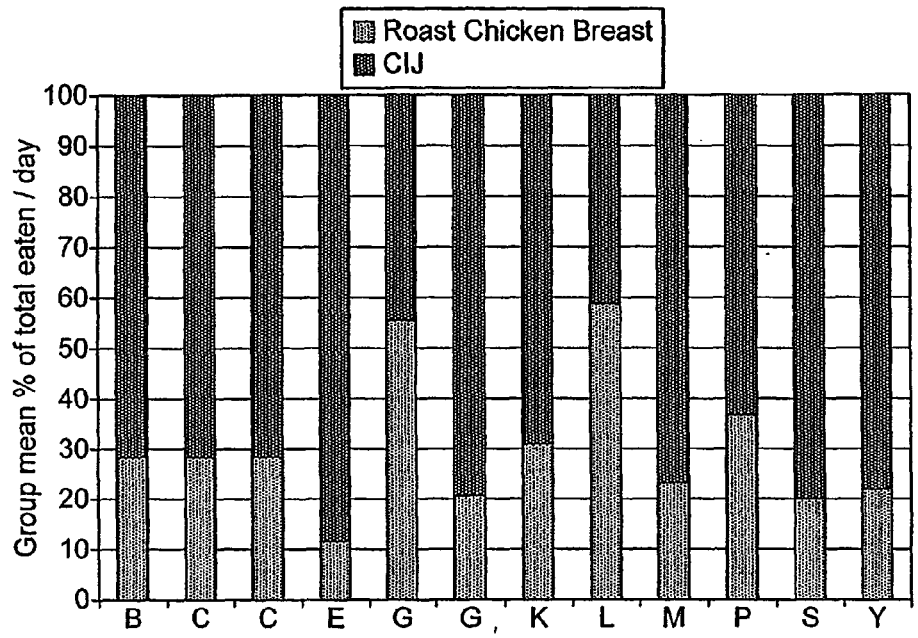

FIG. 37 shows the individual mean % of total eaten during the experienced self-selection phase.

Figure 38:
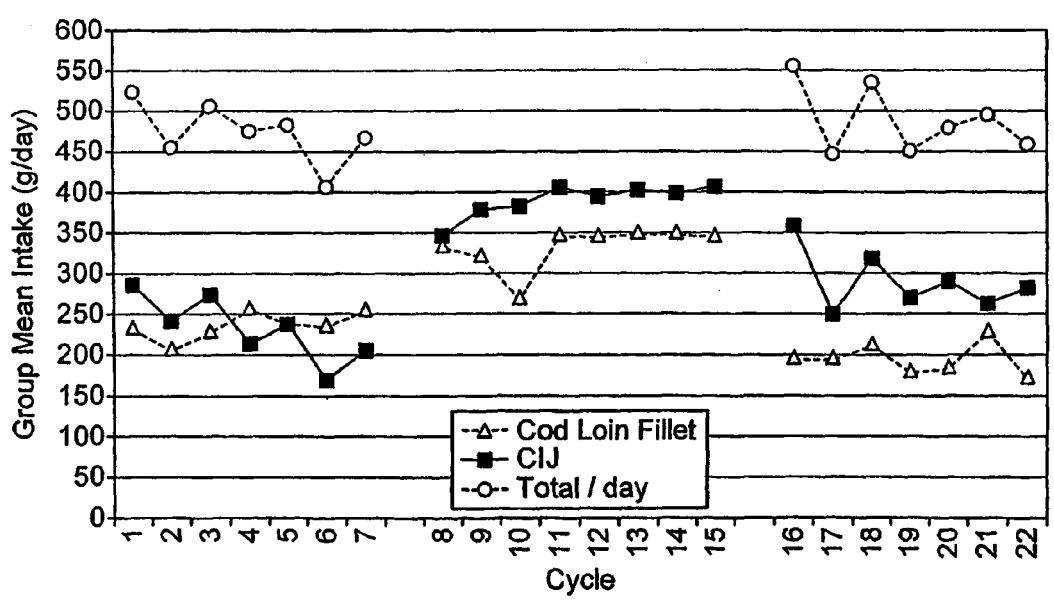

FIG. 38 shows the group mean food intake (g/day) over the three phases.

Figure 39:
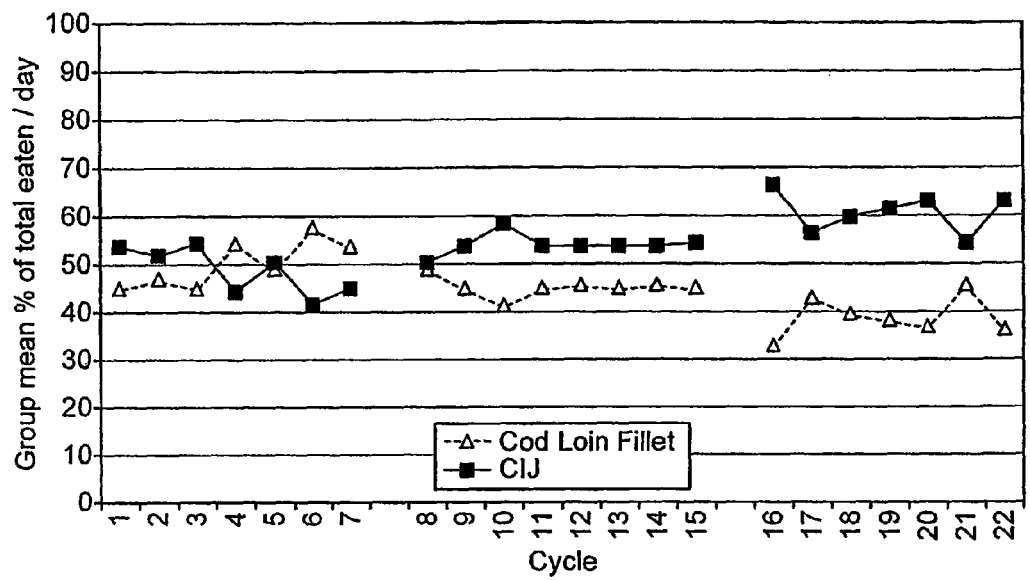

FIG. 39 shows the group mean % of total eaten per day over the three phases.

Figure 40:
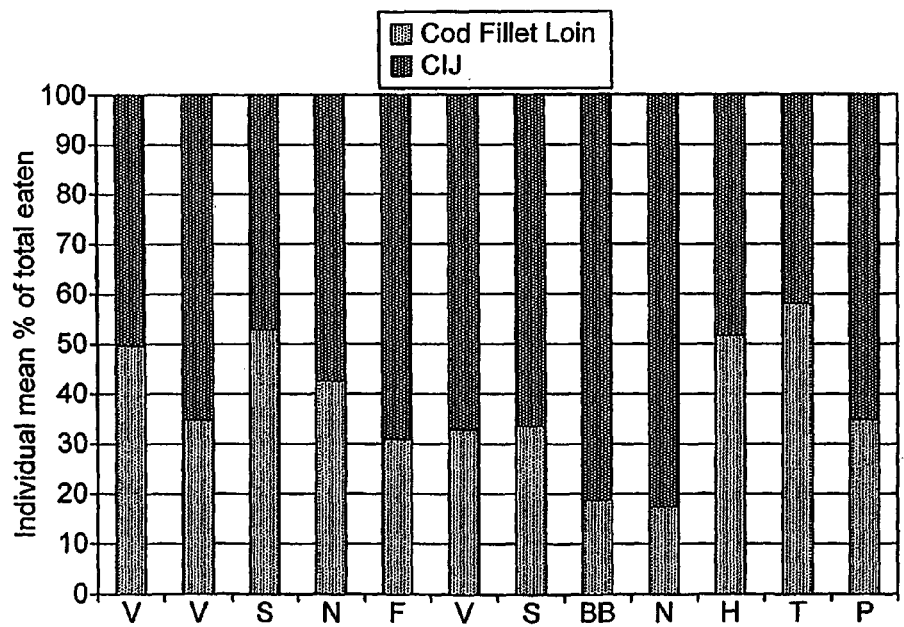

FIG. 40 shows the individual mean % of total eaten during the experienced self-selection phase.

DETAILED DESCRIPTION OF THE INVENTION

The present invention is now described with reference to the following non-limiting examples:

EXAMPLES

Example 1

Study to Assess the Effect of Dietary Macronutrient Profile on Food Selection in Cats Summary Adult cats were fed homogenised diets composed of soy isolate, chicken breast, lard and either carob solution or water. The diets were isocaloric and consisted of a range of ratios of protein to fat energy (P-F:ER), these being 10% PER/90% FER (a PER thought to be close to the cat's minimum protein requirement), 40% PER/60% FER (a PER typical for a canned product) and 70% PER/30% FER. Three flavours of different relative preference were included with the diets, such that each of the 3 groups of cats received different flavour-diet combinations.

During the initial 7 days of self-selection/3-way preference, the naïve cats (with no prior experience of the diets and flavours) appeared to make their diet selection based on the hedonic cues associated with the diets. They selected the diet associated with the preferred flavour, irrespective of the amount of soy isolate and lard.

During the 39 days of learning/training, the cats changed their macronutrient selection and, in terms of mean food intake, responded differently to the macronutrient profile and flavour of the diets.

During the final 7 days of self-selection/3-way preference, these now experienced cats showed different feeding responses to the initial self-selection and appeared to select diets on some other basis, consequently selecting a different macronutrient profile overall. It appeared that the experienced cats had 'learned' about the macronutrient profile of the diet and changed their preferences accordingly, with the low protein/high fat food consistently rejected, regardless of the flavour added. The protein to fat ratio below which the product is rejected is not known and will be investigated in further studies. This should identify the minimum protein level for cat food, based on acceptance rather than nutritional requirement.

Investigation of protein to fat energy ratio (P-F:ER) intake as a potential driver of diet selection showed that the mean P-F:ER consumed during the initial self-selection phase was influenced by the hedonic cues, with each test group having a mean PER intake driven by the diet with which the preferred flavour was associated (mean PER intake 34%; FER intake 66%). In contrast, the mean P-F:ER intake of the same cats once they were experienced was more consistent, with less influence from the hedonic cues during the final self-selection (mean PER intake 49.8%; FER intake 50.2%).

Overall these results suggest that repeated exposure to these experimental diets over an extended period of feeding led to cats changing their dietary preferences, in order to select specific macronutrient profiles. In doing so, they responded less to the hedonic cues and more to the underlying nutritional cues.

Introduction

The traditional approach to palatability has been that taste, smell and texture are very important drivers of intake on initial exposure to a food. More recent studies in cats have led to the hypothesis that, with experience, the underlying nutrition may over-ride these sensory cues, thus causing food choice to change (if it is of benefit for the animal to do so).

The results of previous work suggest that repeated exposure to experimental chicken and lard-based diets over an extended period of feeding leads to cats changing their dietary preferences, in order to select specific macronutrient profiles. In doing so, they respond less to the hedonic cues and more to the underlying nutritional cues. This observation opposes the established belief that cats do not possess 'nutritional wisdom', since hedonics are the only driving factor in food selection.

The aim of this study was to determine whether cats 'learned' about the macronutrient profile of the diet, such that the initial hedonic response was subsequently influenced by physiological responses (which may vary with the macronutrient profile of the diet). Cats were tested prior to experiencing the experimental diets and flavours, then after a period of monadic, repeated exposures to the diets, to determine if their feeding responses had changed through experience.

In order to control the macronutrient profile of the diet within more defined limits than are achievable using a typical wet product recipe, relatively 'clean' sources of macronutrients were used. In the second part of this first phase of work, the macronutrients protein and fat were investigated—soy isolate was used as the predominant protein source, with some chicken breast present in all diets, and lard was used as a fat source.

Diets were designed consisting of increasing levels of protein (soy isolate and chicken), combined with decreasing levels of fat (lard). In order to 'confuse' the cats and mask the natural smell and flavour of the diets, additional flavour cues were added (see 'Methods' section), to reduce selection of a product purely on the basis of its inherent smell or flavour. This should demonstrate if the cats 'learned' about and selected diets on the basis of their protein or fat content per se, when fed over an extended period. The trial was also designed to indicate whether cats preferred a diet containing a specific level of protein and/or fat, when offered an ad libitum choice of the 3 diets.

Methods

Animals

Cats (n=27) were selected that had no prior experience of the experimental diets or flavours. The cats were housed individually and were socialized as a group every day.

Cats were randomised into balanced groups by age, sex and bodyweight.

Diets

Three isocaloric diets were fed, all designed to supply 70 kcal ME (metabolisable energy) per 100 g final product. The diets consisted of a range of ratios of protein to fat energy (P-F:ER), these being 10% PER/90% FER (a PER thought to be close to the cat's minimum protein requirement), 40% PER/60% FER (a PER typical for a canned product) and 70% PER/30% FER. In this study, the diets were essentially carbohydrate-free, with the calorie deficit remaining after inclusion of protein provided by fat calories.

Diets were prepared daily and consisted of a homogenised mixture of powdered soy isolate, cooked chicken breast, lard and either carob solution (3% or 0.5%, w/w) or water. The diets contained differing amounts of carob solution, in order to accomplish similar consistencies. In a preliminary study diets with the same base recipe were prepared with 3 different concentrations of carob solution (0.75%, 1.5% and 3%, w/w) and were fed in a repeated intake test to a panel of 24 cats. The results indicated that the concentration of carob did not affect the relative acceptance of the diets, with no significant difference between the mean intakes recorded (p=0.66).

These recipes were formulated predictively using a combination of proximate analyses of powdered soy isolate (from ICN), processed chicken breast and lard, and published food composition data, to give final products with PER's of 10%, 40% and 70% and an energy density of 70 kcal/100 g final product. Textural differences between the diets were reduced by homogenising the diets, and including varying amounts of carob solution or water, thus making the diets relatively similar in consistency.

The nutritional content of each diet was estimated using the above sources of information. Diets were formulated to meet minimum WALTHAM Cat Nutrient Guidelines for adult maintenance, through addition of vitamin and mineral mixes, taurine and L-methionine (soy isolate being low in sulphur-containing amino acids) and were made up fresh on a daily basis.

Three flavour systems of different relative preference were included with the diets, such that each group of cats received different flavour-diet combinations. This made a total of nine test diets (tables), all of which were fed. The concentration of each flavour was determined by mixing it with the diet and tasting the different flavour-diet combinations. The flavours were added at concentrations which were just detectable by humans by aroma and taste, so were presumed to be detectable by cats. The inclusion level of the flavours was the same for each diet, irrespective of the protein content. The three flavours used were Quest rabbit (0.06% (w/w); 27 drops rabbit flavour added per kg product), Firmenich fish powder (1.5% (w/w); 15 g fish powder added per kg product) and Firmenich orange oil (0.03% (w/w) of a 19% (w/w) solution of orange oil in sunflower oil; 13 drops diluted orange oil added per kg product). [Diluted orange oil was prepared as 10 drops orange oil in 1 g sunflower oil].

The cats were split into 3 groups (n=9 per group), such that each group of cats received different flavour-diet combinations throughout the study, as shown in Table 2.

TABLE 1

Flavour-diet combinations fed.

| Product | PER | Flavour |
| --- | --- | --- |
| A | 10% | fish (F1) |
| B | 40% | rabbit (F2) |
| C | 70% | orange (F3) |
| D | 10% | orange (F3) |
| E | 40% | fish (F1) |
| F | 70% | rabbit (F2) |
| G | 10% | rabbit (F2) |
| H | 40% | orange (F3) |
| I | 70% | fish (F1) |

TABLE 2

Flavour-diet matrix fed.

| Cats | Diet-flavour combinations | | |
| --- | --- | --- | --- |
| Group 1 | 10% + fish | 40% + rabbit | 70% + orange |
| Group 2 | 10% + orange | 40% + fish | 70% + rabbit |
| Group 3 | 10% + rabbit | 40% + orange | 70% + fish |

Feeding Protocols

The feeding protocol consisted of an acclimatization pre-feed followed by 4 different feeding regimens—an initial self-selection/3-way preference phase, a learning/training phase, a final self-selection/3-way preference phase and a challenge to investigate preferred flavour selection.

Acclimatization Pre-Feed (7 d)

To familiarize the cats to the format of the homogenised diets (without exposing them to the soy/chicken/lard diets), a pre-feed of Feline Concentration Instant diet (FCID) was included.

Daily requirements of FCID were calculated on the basis of individual cat bodyweights, then an additional 25% was added, so that each cat (in principle) was being fed to appetite.

Cats were offered a third of their daily requirement of FCID in the morning, and the remainder of their requirement in the afternoon, which remained overnight.

The amount of food offered was increased to 50% above requirement for most of the cats, who consistently consumed all food offered. Food offered was not increased beyond this, since those cats which continued to consume all of this increased ration were deemed to be overeating.

All food intakes were recorded manually every time food was replaced.

Naïve Self-Selection/3-Way Preference Phase (7 d)

For the subsequent 7 days, each cat was given ad libitum access to all 3 of the experimental diets.

Food was replaced with fresh twice per day—150 g of each diet was offered in the morning, which was replaced with 250 g fresh food in the afternoon, which remained overnight.

The position of the products was rotated daily.

Food intakes and meal patterning were recorded constantly. In addition, all food intakes were recorded manually every time food was replaced.

Learning/Training Phase (39 d)

During the learning/training phase, each cat should have received a single product each day, with the 3 diets fed in daily rotation for 30 days. Each cat should therefore have experienced each test diet 10 times.

After completion of cycle 8, supplies of soy isolate ran out, so all cats were transferred to unflavored FCID for 12 days. The learning phase re-started and the cats were given 5 further cycles of learning (cycles 13 to 18). In total, the cats experienced each test diet 13 times.

In order to reduce sequence effects, e.g. to avoid a cat always receiving diet B after diet A, 3 different orders of diet presentation were followed.

Each cat received 200 g of food in the morning, which was replaced with 300 g of the same diet in the afternoon, which was left overnight.

Food intakes and meal patterning were recorded constantly. In addition, all food intakes were recorded manually every time food was replaced.

Experienced Self-Selection/3-Way Preference Phase (7 d)

For the subsequent 7 days, each cat was given ad libitum access to all 3 of the experimental diets they had experienced in the learning phase.

Food was replaced with fresh twice per day—150 g of each diet was offered in the morning, which was replaced with 250 g fresh food in the afternoon, which remained overnight.

The position of the products was rotated daily.

Food intakes and meal patterning were recorded constantly. In addition, all food intakes were recorded manually every time food was replaced.

NOTE: The amount of food offered was increased in cats that consistently consumed all of the food provided.

Bodyweights

Bodyweights were recorded twice per week and closely monitored to assess adequate food intakes.

Data Analysis

During the learning phase, graphs are expressed with 'Cycle' on the x-axis, each 'Cycle' being a pseudo-randomised 3-day rotation of products, and therefore an exposure to each of the diets.

Results
Diets
Nutritional Properties

As mentioned previously, the diets were formulated predictively to give final products with PER's of 10%, 40% and 70% and an energy density of 70 kcal/100 g final product.

Proximate analysis values of the diet ingredients were used, together with Atwater factors (protein 4 kcal/g, fat 9 kcal/g, carbohydrate 4 kcal/g), to calculate the maximum PME of each ingredient.

The maximum PME for each of the diet ingredients was then used to calculate the PME for each of the diets, based on the proportions of the ingredients in each formulation. Corrected PER was calculated using these corrected ME values and the protein values from the diet analysis. The protein content (determined from analytical results) was multiplied by 4 kcal/g and expressed as a percentage of the ME of the diet. Corrected FER was calculated by difference, the diets consisting only of protein and fat calories.

Flavours

The relative preference for all of the flavour-diet combinations plus the unflavored diets was assessed.

Statistical analysis of the data by multifactor ANOVA showed that there was a significant difference between the mean intakes of the test diets ($p<0.001$).

The results confirmed that the relative preference for the three flavour systems used was fish>rabbit=orange oil ($p<0.001$).

The results also showed that the three flavours maintained this ranking across all three base diets (10%, 40%, 70% PER) to which they were added.

It was interesting to note that for the unflavored diets, the relative preference was 40%>70%>10%, however, these differences were not statistically significant. The 40% PER diet was generally preferred over the other test diets, even when flavours were associated with them.

Animals

Four cats were removed from the study after 2-3 weeks on the trial products. This was due to consistently low food intakes.

Testing Responses to Novel Flavours and Macronutrient Profiles: Naïve Self-Selection Phase During the self-selection phase, all 3 test diets were fed every day, with each cat having ad libitum access to sample from the 3 diets throughout the day.

During this initial phase, the cats had no prior experience of these flavours and experimental diets In each test group, cats ate a greater proportion of the diet combined with fish flavour, fish being the preferred flavour hedonically.

These data suggest that cats naïve to the diet format and flavours appeared to make their diet selection based on the hedonic cues associated with the diet. They selected the diet associated with the preferred flavour, irrespective of the amount of soy isolate and lard.

Combining the data from all 3 test groups and assessing diet selection based on protein alone, during the naïve self-selection phase, there was a significantly greater proportion of the 10% PER diet eaten compared with the 40% and 70% PER diets ($p<0.01$).

For all cats, determination of diet selection based on flavour alone showed that the preference for fish flavour over rabbit and orange flavours was clearly apparent ($p<0.001$).

Looking at individual cats, the majority of cats within each test group showed similar diet preferences.

There was no common feature in those cats which showed a different diet selection to the rest of each test group.

Training Cats to Recognise Links Between Flavours and Macronutrient Profiles: Learning Phase During the learning/training phase, each diet was fed on a different day, i.e. only one diet was fed per day. Food intake data were analysed by a 3-day cycle, during which each cat experienced each of the 3 diets within its test group.

Graphical comparison of the mean proportions of food eaten in all the cats at the start (cycle 1) and end (cycle 17) of the learning phase by either flavour alone or PER alone showed interesting differences.

There was a significant difference ($p<0.001$) between the mean intakes of fish, rabbit and orange flavour at the start of the learning phase, with fish flavour preferred over the other 2 flavours. However, by the end of the learning phase, there was no significant difference between the proportions of the flavours consumed.

In contrast, there was no significant difference between the mean intakes of 10%, 40% and 70% PER at the start of the learning phase, however, by the end of the learning phase, the mean intakes of all of the diets were significantly different, with 70%>40%>10% PER.

As seen previously, the intake of the 10% PER diet during the learning phase was markedly lower than the total intake of the other diets, particularly at the end of the learning phase.

These data suggest that in terms of mean food intake, macronutrient profile and flavour behaved differently during the learning phase. The macronutrient profile selected changed over the 39 days of feeding (excluding the days during which FCID was fed).

Testing Trained Links Between Flavours and Macronutrient Profiles: Experienced Self-Selection Phase During the self-selection phase, all 3 test diets were fed every day, with each cat having ad libitum access to sample from the 3 diets throughout the day.

Between the first 'naïve' self-selection phase and this second self-selection phase, the cats experienced a training period to help them associate certain flavours with specific macronutrient profiles, and were thus classified as 'experienced'.

Diet selection in the experienced self-selection differed to that seen in the naive self-selection, where fish flavour (irrespective of PER) was preferred in each test group.

In experienced group 1 cats, cats ate a significantly greater proportion of 70% PER+orange compared with 10% PER+fish and 40% PER+rabbit.

In experienced group 2 cats, cats ate significantly different proportions of each diet, with 40% PER+fish>70% PER+rabbit>10% PER+orange.

In experienced group 3 cats, cats ate significantly different proportions of each diet, with 70% PER+fish>40% PER+orange>10% PER+rabbit.

In all test groups, the 10% PER diet was rejected relative to the other two test diets. In group 1, this rejection was not as great as in the other test groups. One hypothesis for this may be that in group 1, the 10% PER diet was combined with fish flavour, thus improving the hedonic acceptability of the product.

These data suggest that cats with experience of the diet format and flavours consistently rejected the low protein/high fat diet regardless of the flavour associated with it. Experienced cats appeared to base their diet selection on some other attribute of the products, rather than purely on hedonics.

Combining the data from all 3 test groups and assessing diet selection based on protein alone, during the experienced self-selection phase, there were significantly different proportions of each diet consumed, with 70%>40%>10% PER (p<0.001). This was different to the diet selection seen in the same group of cats during the naïve self-selection phase, where 10%>40%=70% PER.

For all cats, determination of diet selection based on flavour alone showed that the preference for each flavour was significantly different, with fish>orange>rabbit (p<0.001). This was similar to that seen in the naive self-selection phase.

Investigation of Daily Diet Selection within Each Test Group

Please note that all food intakes in this section are based on manually recorded data, without any correction for evaporative losses from the food. Typical evaporative loss from these homogenised products has been estimated as 6-7% of the initial weight of the food over a 16 hour period (i.e. overnight).

The previous sections (3.3, 3.4 and 3.5) described mean food intakes within the test groups, however, it is of interest to compare the daily food intakes in more detail.

Group 1

Figure 1:
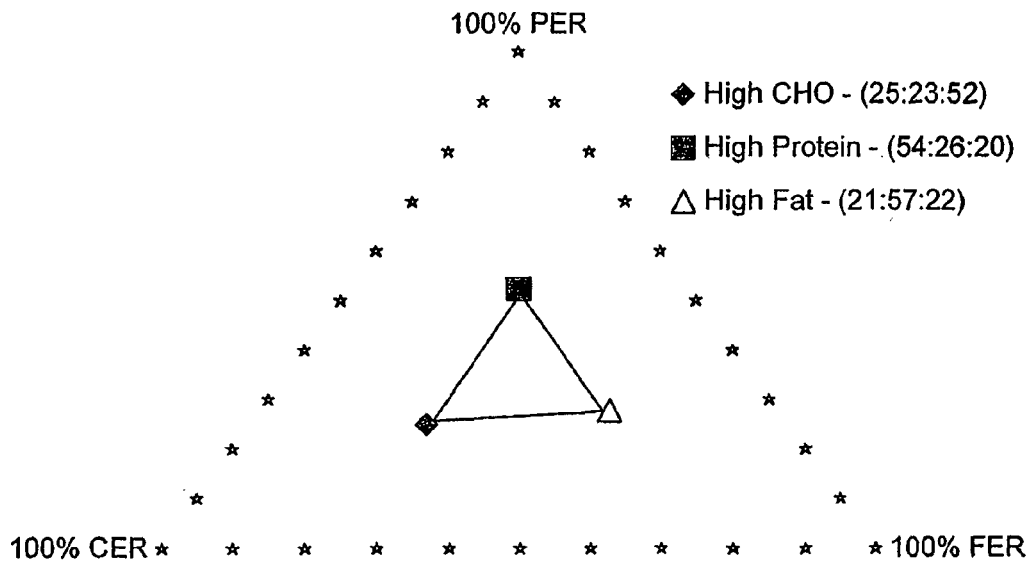
FIG. 1 is a representation, graphically, of the macronutrient content of food.
Figure 2:
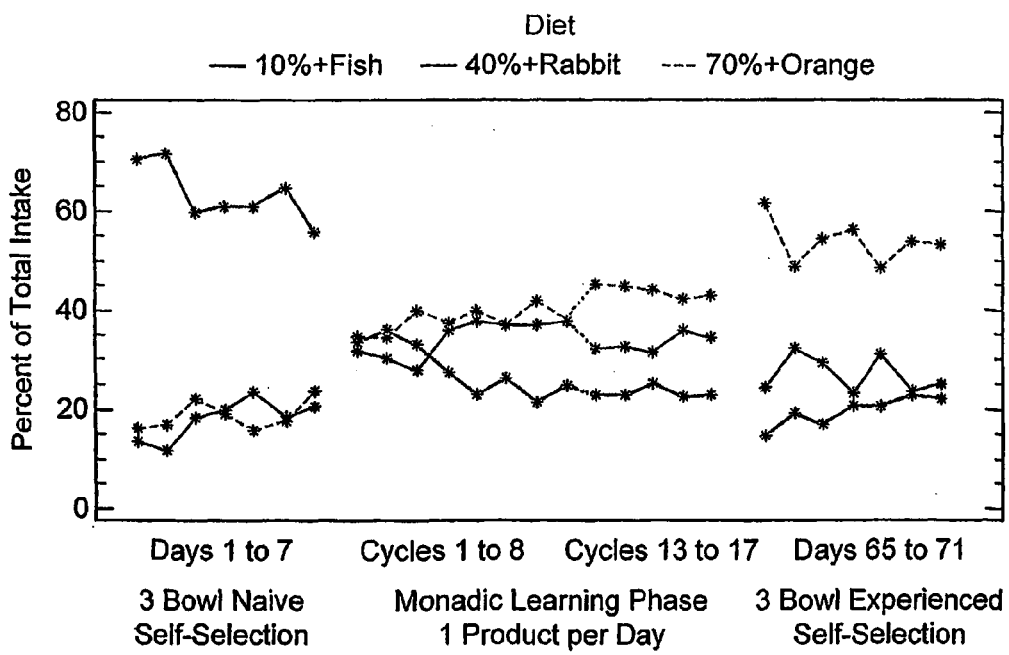
FIG. 2 is a graph of percentage of total intake of food over time. As shown in days 1 to 7, naïve cats selected diet with preferred flavour regardless of nutrient profile.

FIG. 2 shows the daily diet selection of group 1 cats throughout the study (naïve self-selection, learning and experienced self-selection phases).

Naïve self-selection: 10% PER+fish was markedly preferred over the other two test diets from day 1 of the naïve self-selection. Intakes of 40% PER+rabbit and 70% PER+orange were similar.

Learning phase: In cycle 1, intakes of all 3 test diets were very similar, but during the learning phase, the proportion of 10% PER+fish consumed decreased and the proportion of 40% PER+rabbit consumed increased. After the period of FCID, intakes of the 40% and 70% PER diets separated, with 70% PER+orange preferred over 40% PER+rabbit.

Experienced self-selection: the proportion of 70% PER+orange consumed was greater than the other two diets from day 1. Slightly more 40% PER+rabbit was consumed than 10% PER+fish; the proportion of 10% PER+fish consumed was approximately 20%.

P-F:ER Selection as a Potential Driver of Macronutrient Selection

The mean PER intake was calculated for each phase of the trial from food intake data:

Mean PER eaten per day=(Amount test diet eaten (g)×PER of test diet)/Total amount eaten (in g)*

For self-selection phase (naïve/experienced)=sum of 3 test diets eaten per day (in g)

For learning phase=sum of test diets eaten over 3-day cycle (in g)

elf-selection phase (naïve/experienced):Mean PER intake per day=Average of PER eaten per day Learning phase: Mean PER intake per cycle=Average of PER eaten across 3-day cycle The mean FER intake was calculated by difference from the above data.

Throughout the naïve self-selection phase, the mean P-F:ER intake per cycle was calculated. The PER intake varied between each test group of cats, the variation driven predominantly by the PER of the diet with which fish flavour was associated (since in each test group, naïve cats consumed most of the diet paired with fish flavour—see section 3.3). It should be noted that if diet selection was completely random (i.e. sampling from 10%, 40% and 70% PER diets), the mean PER intake would be 40% (with an FER intake of 60%).

All 3 diets were offered together in a sufficient quantity for the cats to achieve their daily energy requirement by eating only one of the products if they desired.

Throughout the learning phase, the mean P-F:ER intake per cycle was calculated. The PER intake was higher than in the previous phase and was fairly constant for each group of cats. The mean PER intake gradually rose throughout the learning phase. On average, the PER selected reflected random sampling from the diets, as described above, i.e. mean PER intake of 40% and FER intake of 60%. This was seen clearly in groups 1 and 2, where the mean PER intake was approximately 40% and FER intake 60%, suggesting that the cats were consuming equal amounts of each diet. When the amount of each diet eaten (in grammes) was compared, this was not the case and different quantities of each diet were being consumed. These data suggest that the mean PER and FER intakes were not derived from random diet sampling.

Throughout the experienced self-selection phase, the mean P-F:ER intake per cycle was calculated. Compared with the naïve self-selection, the response during the experienced self-selection was very different. The mean PER intake remained remarkably constant within each group of cats and was at a higher level than seen initially.

Conclusions

During the initial 7 days of self-selection/3-way preference, the naïve cats (with no prior experience of the diets and flavours) appeared to make their diet selection based on the hedonic cues associated with the diets. They selected the diet associated with the preferred flavour, irrespective of the amount of soy isolate and lard.

During the 39 days of learning/training, the cats changed their macronutrient selection and, in terms of mean food intake, responded differently to the macronutrient profile and flavour of the diets.

During the final 7 days of self-selection/3-way preference, these now experienced cats showed different feeding responses to the initial self-selection and appeared to select diets on some other basis, consequently selecting a different macronutrient profile overall. It appeared that the experienced cats had 'learned' about the macronutrient profile of the diet and changed their preferences accordingly, with the low protein/high fat food consistently rejected, regardless of the flavour added. The protein to fat ratio below which the product is rejected is not known and will be investigated in further studies. This should identify the minimum protein level for cat food, based on acceptance rather than nutritional requirement.

This study confirms that the macronutrient profile (in this case, protein and fat) can affect the long term feeding performance of a food. Feeding regimen is important in this, since the cats required a 'learning' period of repeated exposures before changing their diet selection.

Investigation of mean P-F:ER intake as a potential driver of feeding behaviour showed that naïve cats consumed a variable P-F:ER during the self-selection phase, which was driven by hedonic cues (mean PER intake 34%; FER intake 66%), whereas the mean P-F:ER intake of the same cats once they were experienced tended to be more constant, and overall gave a higher PER value during the self-selection phase (mean PER intake 49.8%; FER intake 50.2%). These results are similar to those seen previously, where the mean PER intake of naïve cats was 42.5% and experienced cats was 54.9%. It appears that P-F:ER intake is a driver of feeding behaviour and macronutrient selection in the long term.

A graph showing details of the preferences is shown in FIG. 2.

The results show that cats which are naive to the diets and flavours select diets based on hedonic cues (i.e. added flavours), whereas experienced cats appear not to use the hedonic cues and select a different macronutrient profile overall. Macronutrient profile therefore affects the long-term feeding performance of a food and diet selection. The study also shows that animals will reject a food if its protein level is too low—the 10% PER/90 FER diet was consistently rejected after a period of learning, irrespective of the flavour added.

The study shows that animals try to make food selections in order to achieve a metabolically desirable mean PER intake.

Example 2

Effect of Macronutrient Profile on the Long-Term Acceptance of Food

Summary

This trial aimed to establish whether the naïve response to the hedonic properties of three diets (carbohydrate enriched, protein enriched and fat enriched) could be modified by a monadic learning phase.

12 adult cats were fed 3 diets during this study following the feeding protocol: 7-days of self-selection/3-way preference followed by 24-days of monadic learning (one product per day) and finally 7 days of self-selection/3 way preference. Cats had approximately 22 hours access to food every day during the trial.

10 out of the 12 cats completed the study; 2 cats were removed from the study due to inadequate food intakes. The mean percentage change in bodyweight during the trial for the cats that completed the study was +2.39%

The naïve response of the cats to the 3 diets was that the protein enriched diet had the highest mean intake (22 g) whilst the carbohydrate and fat enriched diets were slightly lower (mean intake 16 g and 17 g respectively).

The experienced response of the cats to the 3 diets was that the carbohydrate enriched diet was almost completely rejected, with a very low mean intake (6 g). There was a slight increase in the mean intake of the fat enriched diet (21 g), compared to the naïve response, and a large increase in mean intake of the protein enriched diet (41 g).

Investigation of the proportion of energy intakes of protein, fat and carbohydrate (P/F/CER) showed naïve cats consumed 36%/30%/34% respectively, averaged over all cats and all days of the naïve self-selection phase. The same analysis of P/F/CER during the experienced self-selection showed the proportion of macronutrients consumed was 42%/30%/29% respectively averaged over all cats and all days of the experienced self-selection phase In summary, the carbohydrate enriched diet was almost completely rejected after a monadic learning phase whilst selection of the protein enriched diet almost doubled in terms of g intake. Analysis of the macronutrient selection of the cats showed a 6% increase in protein and 5% decrease in carbohydrate intake after a period of monadic learning, the proportion of fat intake remained constant Introduction A previous study was run to establish whether the naïve response to the macronutrient profile of three dry diets could be modified by a period of monadic learning on a panel of 163 cats.

The aim of this study was to use the same diets and trial design on a further panel of cats.

Methods

Animals

Cats (n=12) were selected that had been fed dry kibble diets throughout life, from the time they were weaned.

The cats were housed individually and were socialized as a group every day.

Diets

Three dry kibble diets were fed during the study. One enriched with protein, one enriched with fat and one enriched with carbohydrate. Analysis of the diets provided the predicted metabolisable energy (PME) content of each diet, the values of which are shown in Table 1. The protein, carbohydrate and fat content of each diet was analysed and calculated to provide the ratio of each macronutrient relative to the total energy (PME) of each diet i.e. Protein/Fat/Carbohydrate Energy Ratio (P/F/CER in Table 1).

TABLE 1

PME and macronutrient energy ratios for the diets used

| Diet Code | PER:FER:CER | PME (Kcal/100 g) |
|---|---|---|
| A (carbohydrate enriched) | 26%/22%/52% | 344 |

TABLE 1-continued

PME and macronutrient energy ratios for the diets used

| Diet Code | PER:FER:CER | PME (Kcal/100 g) |
|---|---|---|
| B (protein enriched) | 51%/23%/26% | 336 |
| C (fat enriched) | 27%/45%/28% | 404 |

Feeding Protocols

The feeding protocol consisted of 3 different feeding regimes—an initial self-selection/3 way preference, a learning/training phase and a final self selection/3-way preference phase.

Naïve Self Selection/3-Way Preference Phase (7 d)

Each cat received ad libitum access to all 3 experimental diets.

150 g of each diet was offered at 10:15 am and left available until 8:15 am the following morning giving each cat 22 hours exposure to the diets on each day. This feeding cycle was repeated daily for 7 days.

The position of the diets was rotated daily.

Food intakes and feeding patterns were recording constantly. In addition, food intakes were recorded manually every time food was replaced.

Learning/Training Phase (24 d)

During the learning/training phase, each cat received a single test diet each day The three diets experienced by the cats during the naïve self selection were fed in daily rotation for the 24 days. Each cat therefore experienced each experimental diet 8 times.

150 g of a single diet was offered at 10:15 am and left available until 8:15 am the following morning. This feeding cycle was repeated daily for 24 days, giving each cat 22 hours exposure to the diet on each day.

Cats were randomly assigned to one of 6 groups with each group receiving the diets in a different rotation sequence.

Food intakes and feeding patterns were recorded constantly. In addition, food intakes were recorded manually every time food was replaced.

Experienced Self-Selection/3-Way Preference (7 d)

Each cat received ad libitum access to all 3 experimental diets.

150 g of each diet was offered at 10:15 am and left available until 8:15 am the following morning giving each cat 22 hours exposure to the diets on each day. This feeding cycle was repeated daily for 7 days.

The position of the diets was rotated daily.

Food intakes and feeding patterns were recording constantly. In addition, food intakes were recorded manually every time food was replaced.

Bodyweights

Bodyweights were recorded twice weekly and closely monitored to assess adequate food intakes.

Data Analysis

Feeding pattern data were analysed by computer software that splits the data into individual meals, giving time, duration, rate and latency of each. These could then be analysed for each cat and each diet.

Note: During the learning phase, graphs are expressed with 'cycle' on the x-axis. Each 'cycle' is a pseudo-randomised 3-day rotation of products, and therefore includes an exposure to each of the 3 diets.

Results

Animals

Two cats were removed from the trial due to consistently poor food intakes. All food intakes for these cats are excluded from this report thus decreasing the sample size to 10 cats.

The mean percentage change in bodyweight, averaged over all cats that completed the study from the start of the trial to the end of the trial was +2.4%. The progress of this change is shown in FIG. 3.

There were only 2 cats that completed the study which showed a decrease in bodyweight (−2.53% and −0.79% respectively). 2 cats' bodyweights increased more than 6% during the trial. All other cats showed a, less than 5%, increase in bodyweight. 6 out of 10 of the cats showed a dip in bodyweight during the first couple of weeks of the trial this is often seen in cats that change diets.

Naïve Self-Selection Phase

During the naïve self-selection phase, all 3 test diets were fed every day. All cats received ad libitum access to the diets for 22 hours each day. The diets were removed at 8:15 am every morning and replaced with fresh diet at 10:15 am.

All cats were naïve to the experimental diets except for 3 cats who were exposed to each diet twice during a six-day period.

FIG. 4 shows the daily mean food intake, averaged over all cats, for each diet during this 7-day phase. Mean daily intakes of each diet were similar, intakes of diet B (high protein) were slightly higher on day 2, 4, 5 and 6 than the other 2 diets.

FIG. 5 shows the mean food intake, averaged over all cats and all days for each diet during the 7-day naïve self-selection phase. On average, the intake for diet B (high protein) was slightly higher than both diet A and diet C (p=0.02)

FIG. 6 shows the proportion of total eaten of each diet, averaged over all days, for each cat during naïve self-selection Learning Phase FIG. 7 shows the daily mean intake, averaged over all cats, for each diet during each of the eight 3-day cycles. In the figure, significantly different p<0.001.

FIG. 8 shows the daily mean intake, averaged over cats and all cycles, for each diet during the learning phase (including results from naïve self-selection).

Experienced Self-Selection

FIG. 9 shows the daily mean intake, averaged over all cats, for each diet during experienced self-selection. In the figure, significantly different p<0.001.

FIG. 10 shows the mean daily intake, averaged over all cats and all days, for each diet during experienced self-selection.

FIG. 11 shows the mean daily intake, averaged over all cats and all days, for each diet during experienced self-selection.

P/F/CER Selection as a Potential Driver of Macronutrient Selection

Each cats mean energy ratio intake was calculated for each phase of the trial from the food intake data.

The calculation used was:

$$\text{Mean } PER \text{ eaten per day} = \frac{\sum_{Overall 3 test diets}(\text{Amount of test diet eaten (g)} \times PER \text{ of test diet})}{\text{Total amount eaten (g)}^*}$$

*For self-selection phase(naïve/experienced) = sum of 3 test diets eaten per day (g)

For learning phase = sum of 3 test diets eaten over 3-day cycle (g)

The daily/per cycle mean PER intake was calculated for each cat.

This was repeated for both FER and CER.

Table 3 shows the mean daily/per cycle PER, FER, CER for each phase of the trial, averaged over all cats.

TABLE 3

Mean cycle PER, FER and CER intake for each phase

|  | Naïve self-selection | Learning | Experienced self-selection |
|---|---|---|---|
| PER | 36.2 | 36.2 | 41.6 |
| FER | 29.6 | 31.7 | 29.7 |
| CER | 34.2 | 32.1 | 28.8 |

TABLE 4

Mean intake (g) of each diet during each phase

|  | Diet A (High Carbohydrate) | Diet B (High Protein) | Diet C (High Fat) |
|---|---|---|---|
| Naïve self-selection | 15.8 | 21.6 | 17 |
| Learning | 35.7 | 68.4 | 70.2 |
| Experienced self-selection | 5.5 | 40.9 | 20.5 |

FIG. 12 shows the mean daily P/F/CER intake during the trial.

Example 3

Effect of Macronutrient Profile on the Long-Term Acceptance of Food

Effect of Varying Protein and Fat Energy Ratios

Summary 12 adult cats were fed 3 diets (one high in protein, one high in fat and one intermediate) during this study following the feeding protocol: 7-days of self-selection/3-way preference followed by 24-days of monadic learning (one product per day) and finally 7 days of self-selection/3 way preference. Cats had approximately 22 hours access to food every day during the trial.

All 12 cats completed the study. The mean percentage change in bodyweight during the trial for the cats was +2.2%

The naïve response of the cats to the 3 diets was that the high protein and intermediate diets were preferred (mean intakes 19 g and 22 g respectively) over the high fat diet (mean intake 11 g)

The experienced response of the cats to the 3 diets was similar to that seen during the naïve self-selection in that the high protein and intermediate diets were preferred (mean intakes 26 g and 25 g respectively) over the high fat diet (mean intake 6.4 g).

Investigation of the proportion of energy intakes of protein and fat (P/FER) showed naïve cats consumed 37%/38% respectively, averaged over all cats and all days of the naïve self-selection phase. The same analysis of P/FER during the experienced self-selection showed the proportion of macronutrients consumed was 39%/36% respectively averaged over all cats and all days of the experienced self-selection phase.

Cats consumed equal amounts of each diet during the monadic learning phase. Analysis of feeding pattern on the days cats were offered the high fat diet alone suggests the cats were either "holding out" for something better and then eating the diet, or, were regulating the speed of fat intake.

In summary, the high protein and intermediate diets appeared to be hedonically more palatable than the high fat diet. The increased rejection of the high fat diet alongside the increase in PER and decrease in FER during the experienced self-selection (+2% and −2% respectively) provides evidence that the macronutrient profile of the high fat/low protein (22% PER/53% FER) diet is less preferable than the intermediate (34% PER/42% FER) and high protein (48% PER/26% FER) diets.

Introduction

This study is to establish whether the naïve response to the macronutrient profile of dry diets can be modified by a period of monadic learning. The aim of this study was to assess diets with equal carbohydrate energy ratios (CER) but variable protein and fat energy ratios such that one diet had a high fat energy ratio (FER), another had a high protein energy ratio (PER) and a third diet had an intermediate energy ratio of protein and fat.

Methods

Animals

Cats (n=12) were selected that had been fed dry kibble diets throughout life, from the time they were weaned.

The cats were housed individually and were socialized as a group every day.

Diets

Three dry kibble diets were fed during the study. The diets were designed to all contain the same level of carbohydrate whilst one diet was enriched with protein, one enriched with fat and the other was the intermediate of the other two diets. Analysis of the diets provided the predicted metabolisable energy (PME) content of each diet, the values of which are shown in Table 1. The protein, carbohydrate and fat content of each diet was analysed and calculated to provide the ratio of each macronutrient relative to the total energy (PME) of each diet i.e. Protein/Fat/Carbohydrate Energy Ratio (P/F/CER in Table 1).

TABLE 1

PME and macronutrient energy ratios for diets

| Diet Code | PER:FER:CER | PME (Kcal/100 g) |
|---|---|---|
| B (High Protein) | 48%/26%/26% | 346 |
| C (High Fat) | 22%/53%/25% | 391 |
| F (Intermediate) | 34%/42%/24% | 427 |

Feeding Protocols

The feeding protocol consisted of 3 different feeding regimes—an initial self-selection/3 way preference phase, a learning/training phase and a final self selection/3-way preference phase.

Naïve Self Selection/3-Way Preference Phase (7 d)

Each cat received ad libitum access to all 3 experimental diets.

150 g of each diet was offered at 10:15 am and was left in the lodge until 8:15 am the following morning giving each cat 22 hours exposure to the diets on each day. This feeding cycle was repeated daily for 7 days.

The position of the diets available was rotated daily.

Food intakes and feeding patterns were recorded constantly. In addition, food intakes were recorded manually every time food was replaced.

Learning/Training Phase (24 d)

During the learning/training phase, each cat received a single test diet each day The three diets experienced by the cats during the naïve self-selection were fed in daily rotation for the 24-days. Each cat therefore experienced each experimental diet 8 times.

150 g of a single diet was offered at 10:15 am and left in the lodge until 8:15 am the following morning. This feeding cycle was repeated daily for 24 days, giving each cat 22 hours exposure to the diet on each day.

Cats were randomly assigned to one of 6 groups with each group receiving the diets in a different rotation sequence.

Food intakes and feeding patterns were recorded constantly. In addition, food intakes were recorded manually every time food was replaced.

Experienced Self-Selection/3-Way Preference (7 d)

Each cat received ad libitum access to all 3 experimental diets.

See Phase 1

The position of the diets available was rotated daily.

Food intakes and feeding patterns were recorded constantly. In addition, food intakes were recorded manually every time food was replaced.

Bodyweights

Bodyweights were recorded twice weekly and closely monitored to ensure adequate food intakes.

Data Analysis

Feeding pattern data were analysed by computer software that splits the data into individual meals, giving time, duration, rate and latency of each parameter. These could then be analysed for each cat and each diet. Overall, 5% of the data was lost for this trial.

Note: During the learning phase, graphs are expressed with 'cycle' on the x-axis. Each 'cycle' is a pseudo-randomised 3-day rotation of products, and therefore includes an exposure to each of the 3 diets.

Results and Data Analysis

Animals

All cats completed the study. The mean percentage change in bodyweight from the start of the trial to the end of the trial was +2.2% averaged over all cats.

Naïve Self-Selection Phase

During the naïve self-selection phase, all 3 test diets were fed every day. All cats received ad libitum access to the diets for 22 hours each day. The diets were removed from each lodge at 8:15 am every morning and replaced with fresh diet at 10:15 am.

The cats had no prior experience of the experimental diets prior to the start of this initial phase.

FIG. 13 shows the daily mean food intake, averaged over all cats, for each diet during this 7-day phase. Daily mean intakes of diet B (high protein) and diet F (intermediate) fluctuated throughout the phase but were consistently higher than diet C (high fat).

FIG. 14 shows the mean food intake, averaged over all cats, and all days for each diet during the 7-day naïve self-selection phase. On average, the intakes of diet B (high protein) and diet F (intermediate) were significantly higher than diet C (high fat), $p<0.001$ FIG. 15 shows the proportion of the total intake of each of the diets for individual cats averaged over all 7 days of the naïve self-selection phase. This shows that the majority of cats follow the pattern shown in FIG. 14.

FIG. 16 shows the results of using the data to look at the intake pattern of the 3 diets throughout the course of the day. For analysis the day was arbitrarily split into in six 4-hour time blocks. The highest intakes of each diet were during the first 4-hour time block i.e. after food was offered (9 am-1 pm). The intake for diet C (high fat) remained fairly constant throughout the rest of the day whilst consumption of diet B (high protein) and diet F (intermediate) were more variable. The highest mean intakes were of diet B (high protein) between 5 am and 5 pm then diet F (intermediate) from 5 pm to 5 am, however, individual cat intake patterns and daily mean intake patterns show considerable variability in feeding patterns.

Learning Phase

During the monadic learning phase each cat received ad libitum access to a single test diet for 22 hours each day, with each group of cats receiving different diets according to cyclic rotation. The diets were removed from each lodge at 8:15 am every morning and replaced with fresh diet at 10:15 am to allow for cleaning. Food intake data was analysed by 3-day cycle, during which each cat experienced all 3 diets.

FIG. 17 shows the daily mean food intake, averaged over all cats, for each diet during each of the 3-day cycles. Intakes for all diets remained fairly constant during the learning phase. Intakes of diet F (intermediate) were marginally higher than the other test diets during cycles 11, 12 and 14 but overall there were no differences in the intake of the three test diets FIG. 18 shows the daily mean food intake, averaged over all cats and all cycles, for each diet during the learning phase. There were no significant differences in the intakes of each diet during this phase.

FIG. 19 shows the proportion of total intake of each of the diets for each cat averaged over all cycles of the learning phase. This shows that, during the learning phase, individual cats followed a similar intake pattern to the overall group mean for each diet.

FIG. 20 shows the results of using the data to look at the intake pattern of the 3 diets throughout the course of the day, in 4-hour time blocks. Note: No food was available to the cats between 8.15 am and 10.15 am each day. Cats were offered one diet per day, unlike the other two phases, for which all three diets were offered simultaneously. A similar pattern of food intake to that seen during the naïve self selection phase was seen during the learning phase such that majority of the high protein and intermediate diets was consumed between 9 am and 5 pm. The amount of high fat diet consumed between 9 am and 1 pm was relatively low compared to the other test diets, was similar between 1 pm and 5 pm and then highest between 5 pm and 1 am. Individual cat intake patterns and daily mean intake patterns show variability.

Experienced Self-Selection

During the experienced self-selection phase, all 3 test diets were fed every day. All cats received ad libitum access to the diets for 22 hours each day. The diets were removed at 8:15 am every morning and replaced with fresh diet at 10:15 am to allow for cleaning.

FIG. 21 shows the daily mean food intake, averaged over all cats, for each diet during each day. Intakes for diet C (high fat) were consistently low throughout this phase whilst diet B (high protein) remained fairly constant. Intakes of diet F (intermediate) fluctuated daily above and below that of diet B (high protein).

FIG. 22 shows the mean intake, averaged over all cats, for each diet during the 7-day experienced self-selection phase. On average, the intakes of diet B (high protein) and diet F (intermediate) were significantly higher than of diet C (high fat), $p<0.001$ FIG. 23 shows the proportion of total food intake of each of the diets for individual cats averaged over all days of the experienced self-selection. Proportions vary considerably amongst individuals. Two out of the 12 cats in the study had a markedly higher than average proportional intake of diet C (high fat). The remaining 10 cats almost completely rejected diet C (high fat). Two cats followed the mean intake pattern seen in FIG. 22 whilst the rest of the cats had either a high intake of diet B (high protein) or diet F (intermediate).

FIG. 24 shows the results of using data to look at the intake pattern of the 3 diets throughout the course of the day, in 4-hour time blocks. Note: No food was available to the cats between 8.15 am and 10.15 am each day. The highest intakes of each diet were during the first 4-hour block after food is offered. The intake for diet C (high fat) remained fairly constant throughout the rest of the day whilst diets B (high protein) and F (intermediate) fluctuated. The highest mean intakes were of diet B (high protein) between 5 am until 5 pm then diet F (intermediate) from 5 pm to 5 am, however, individual cat intake patterns and daily mean intake patterns show considerable variability in feeding patterns.

P/F/CER Selection as a Potential Driver of Macronutrient Selection

The mean PER intake was calculated for each cat for each phase of the trial from the food intake data.

The calculation used was:

$$\text{Mean } PER \text{ eaten per day} = \frac{\sum_{\text{Over all 3 test diets}} (\text{Amount of test diet eaten (g)} \times PER \text{ of test diet})}{\text{Total amount eaten (g)}^*}$$

*For self-selection phase(naïve/experienced) = sum of 3 test diets eaten per day (g)

For learning phase = sum of 3 test diets eaten over 3-day cycle (g)

The daily/per cycle mean PER intake was calculated for each cat. This was repeated for FER.

Note: CER values were 25% for all calculations performed and are excluded from the discussions below.

Table 3 shows the mean daily/cycle PER and FER for each phase of the trial, averaged over all cats. If random sampling had taken place and thus equal amounts of each diet were eaten, the expected PER/FER would be 35%/40%. Energy ratios during the learning phase were very close to random sampling values as the g intake for each diet were very similar (See Table 4 for g intake). Energy ratios during the naïve self-selection were closer to random sampling values than during the experienced self-selection. PER was higher and FER was lower than random sampling in the naïve and experienced phases.

TABLE 3

Mean cycle PER, FER and CER intake for each phase

|  | Naïve self-selection | Learning | Experienced self-selection |
|---|---|---|---|
| PER | 36.7% | 34.7% | 39% |
| FER | 38.4% | 40.4% | 36% |

TABLE 4

Mean daily intake (g) of each diet during each phase

|  | Diet B (High Protein) | Diet C (High Fat) | Diet F (Intermediate) |
|---|---|---|---|
| Naïve self-selection (3 diets offered) | 19.2 | 10.9 | 21.5 |
| Learning (one diet offered) | 51.9 | 51.6 | 55.8 |
| Experienced self-selection (3 diets offered) | 26.0 | 6.4 | 25.0 |

FIG. 25 shows the mean P/FER for each cycle during each phase of the trial. PER was lower than FER during the naïve self-selection for each cycle (day), except the $3^{rd}$ when both were about equal. PER intake was lower and FER was higher during the monadic learning phase than during the naïve self selection phase and remained relatively constant during each 3-day cycle of the monadic learning phase. There was a switch during the experienced self-selection such that PER was higher than FER for all cycles (days) except 19 and 20 when they were comparable.

Conclusions

Group analysis of cycle mean intake showed that the high protein (48% PER/26% FER) and intermediate diets (34% PER/42% FER) were equal before, during and after a period of monadic learning. This suggests that, on average, these diets are equal in preference in terms of hedonics and macronutrient profile. Analysis of individual cat response showed a distinctive shift in preference in the majority of experienced cats towards one or the other of these diet.

Mean cycle intakes of the high fat diet (22% PER/53% FER) were considerably lower than the other diets during the self-selection phases when all 3 diets were offered. There was a decrease in intake of the diet after a period of monadic learning suggesting that the macronutrient profile was less desirable than the other diets.

Food intakes of all 3 diets were equal during the monadic learning phase when each diet was offered individually each day. Cats were therefore willing to eat the high fat diet if no other option was available. Investigation of feeding pattern during the monadic learning phase showed that the cats didn't eat the high fat diet as rapidly as the other test diets after they were offered in the morning. This could be that the cats were holding out for another option on the days that they were offered the high fat diet and then eating it when no other diets were offered. Alternatively they were regulating the rate at which fat was consumed.

Example 4

Effect of Macronutrient Profile on the Long-Term Acceptance of Food

Effect of Varying Carbohydrate and Fat Energy Ratios

Summary 12 adult cats were fed 3 diets (one high in carbohydrate, one high in fat and one intermediate). This study the followed the following feeding regime: 7-days of self-selection/3-way preference followed by 24-days of monadic learning (one diet per day) and finally 7 days of self-selection/3-way preference. Cats had approximately 22 hours access to food every day during the trial.

Of the 12 cats allocated, 11 completed the study.

One cat was withdrawn from trial in the 3$^{rd}$ week due to low intakes in the self-selection phase and frequent refusals in the monadic phase. Data from this cat has not been calculated in the means.

The mean percentage change in bodyweight during the trial, for the cats that completed the study was −1.6%.

The 1$^{st}$ phase response of the cats to the 3 diets was that the high carbohydrate and intermediate diets were preferred (mean intakes 18.4 g and 14.3 g respectively) over the high fat diet (mean intake 9.3 g). It should be noted however, that the intake of intermediate fluctuated and the intake of the high fat diet showed a marked upturn at the 7$^{th}$ cycle, which may indicate that a change of preference was taking place.

The experienced response of the cats to the 3 diets was very different to that seen during the naïve self-selection. High fat diet was preferred (mean intake 57.3 g) to the high carbohydrate and intermediate (mean intakes 3.1 g and 7.5 g respectively).

Investigation of the mean proportion energy intakes of protein and fat (PER/FER) showed cats consumed 24.4% PER, 34.1% FER in the naïve self-selection phase. The same analysis of PER/FER during the experienced self-selection showed the mean proportion of macronutrients consumed to be 26.9% PER, 50.7% FER in the experienced self-selection phase.

In summary, the high fat diet appeared to be hedonically more palatable than the high carbohydrate and intermediate diets. The increased preference for the high fat diet against the decrease in CER and PER during the experienced self-selection (+14.6% and −2% respectively), provides evidence that the macronutrient profile of the high fat (22% PER, 54% FER, 24% CER) diet is preferred to the intermediate (24% PER, 38% FER, 38% CER) and high carbohydrate (26% PER, 21% FER, 53% CER) diets.

Introduction

The aim of this study was to assess diets with similar protein energy ratios (PER) but variable carbohydrate and fat energy ratios. One diet had a high fat energy ratio (FER), another had a high carbohydrate energy ratio (CER) and a third diet had an intermediate energy ratio of carbohydrate and fat.

Methodology

Animals

Cats (n=12) were selected that had been fed dry kibble diets throughout life, from the weaning.

The cats were housed individually and were socialized as a group every day.

Diets

Three dry kibble diets were fed during the study. The diets were designed to all contain the same level of protein whilst one diet was enriched with carbohydrate, one enriched with fat and a third was the intermediate of the other two diets. Analysis of the diets provided the predicted metabolisable energy (PME) content of each diet, the values of which are shown in Table 1. The protein, carbohydrate and fat content of each diet was analysed and calculated to provide the ratio of each macronutrient relative to the total energy (PME) of each diet i.e. Protein/Fat/Carbohydrate Energy Ratio (P/F/CER in Table 1).

TABLE 1

PME and macronutrient energy ratios for BS0114 diets

| Diet Code | % expected PER:FER:CER | PME (Kcal/100 g) |
|---|---|---|
| A (High Carbohydrate) | 26/21/53 | 346 |
| D (Intermediate) | 24/38/38 | 390 |
| C (High Fat) | 22/54/24 | 436 |

Feeding Protocols

The feeding protocol used is set out in Example 2.

Bodyweights

Bodyweights were recorded twice weekly and closely monitored to ensure adequate food intakes.

Data Analysis

Is as set out in Example 2.

Results and Data Analysis

Animals

Of the 12 cats that started, 11 cats completed the study.

The mean percentage change in bodyweight from the start of the trial to the end of the trial was −1.6% averaged over all cats.

FIG. 26 shows the mean intakes throughout the trial.

This chart shows the mean intakes throughout the trial. The 3 phases are identified as:

Naïve=cycles 1 to 7

Learning=cycles 8 to 15

Experienced=cycles 1.6 to 22.

It can seen quite clearly that the cats having sampled all the diets during the naïve phase of self-selection, then proceeded to make a clear choice of the high fat diet over the intermediate and high carbohydrate diets in the remaining 2 phases.

P/F/CER Selection as a Potential Driver of Macronutrient Selection

The mean FER intake was calculated as set out in Example 2.

If random sampling had taken place and thus equal amounts of each diet were eaten, the expected PER/FER/CER would be 24%/38%/38%.

Table 3 shows the mean cycle PER, FER and CER intake.

TABLE 3

Mean cycle PER, FER and CER intake for each phase.

| | Phase 1 Naïve self-selection | Phase 2 Learning/Monadic | Phase 3 Experienced self-selection |
|---|---|---|---|
| PER (%) | 19.5 | 18.5 | 17.7 |
| ER (%) | 34.7 | 42.3 | 49.4 |
| CER (%) | 19.5 | 39.3 | 32.9 |

During the naive phase all 3 energy ratio intakes were less than would be expected from random sampling.

FER and CER ratios during the learning phase were greater and PER was less than expected if random sampling was taking place.

During experienced self-selection FER was greater and both PER and CER were less than expected if random sampling was taking place.

TABLE 4

Mean daily intake (g) of each diet for each phase

| | Phase 1 Naïve self-selection (3 diets offered) | Phase 2 Learning/ Monadic (one diet offered) | Phase 3 Experienced self-selection (3 diets offered) |
|---|---|---|---|
| Diet A (High CHO) | 18.4 | 32.9 | 3.1 |
| Diet C (High Fat) | 9.3 | 68.7 | 57.3 |
| Diet D (Intermediate) | 14.3 | 51.6 | 7.5 |

TABLE 5

Mean daily intake (g) of macro-nutrient for each phase

| | Phase 1 Naïve self-selection | Phase 2 Learning/Monadic | | | Phase 3 Experienced self-selection |
|---|---|---|---|---|---|
| | | Diet A | Diet C | Diet D | |
| Protein (g/day) | 8.9 | 6.9 | 10.6 | 14.9 | 14.6 |
| Fat (g/day) | 6.7 | 3.1 | 9.1 | 18.2 | 16.8 |
| CHO (g/day) | 20.6 | 18.1 | 24.8 | 26.3 | 27.3 |

Tables 4 & 5 show the mean intakes in grams of the diets and the macronutrients, through the three phases of the trial. These also show that the high carbohydrate diet was rejected after the initial experiences of the naïve phase, in favour of the high fat diet.

FIG. 27 shows the mean C/FER for each cycle during each phase of the trial. FER was lower than CER during the naïve self-selection for each cycle (day).

CER intake was lower and FER was higher during the monadic learning phase than during the naïve self-selection phase and remained relatively constant during each 3-day cycle of the monadic learning phase.

During the experienced self-selection FER was higher than CER for all cycles (days).

This suggests that during the naïve phase the cats were learning that there was a difference between the 3 diets, and that in the following two phases they were actively seeking out the fat enriched diet in preference to the other two diets.

Conclusions

Analysis of cycle mean intakes showed that the high fat diet was consistently preferred to the other two diets, after the initial sampling in the naïve phase. This suggests that selection is taking place and not merely a random sampling of diets.

Mean cycle intakes of the high fat diet were considerably higher than the other diets during both the learning monadic and the experienced self-selection phases. There was a decreased intake of the high carbohydrate and intermediate diets indicating they were less preferred to the high fat diet.

Previous trials show that cats will reject diets with a PER of 20% or less after a period of monadic learning. The PER was a constant in this trial at 24% and as such has no impact on the macronutrient selection.

Analysis of feeding patterns showed that intake of the high carbohydrate and intermediate diets, in the naïve phase, was greater in the time slots between 9:00 am and 5:00 pm. After this time all intakes were similar.

During the monadic learning phase the intake of the high fat diet was higher and the pattern also showed an upturn of intake in the 1:00 am-5:00 am time-slot. This suggests that the cats had learnt that the next meal would be a less preferred diet and were compensating for that.

Investigation of feeding patterns during the monadic learning phase showed that the cats didn't eat the high carbohydrate diet as readily as the other test diets. This suggests that the cats were holding out for another option.

Example 5

Effect of Macronutrient Profile on the Long-Term Acceptance of Food

Effect of Varying Carbohydrate and Protein Energy Ratios

Summary 12 adult cats were fed 3 diets (one high in carbohydrate, one high in protein and one intermediate). This study the followed the following feeding regime: 7-days of self-selection/3-way preference followed by 24-days of monadic learning (one diet per day) and finally 7 days of self-selection/3 way preference. Cats had approximately 22 hours access to food every day during the trial. All 12 cats completed the trial.

The mean percentage change in bodyweight during the trial, for the cats that completed the study was +2.3%.

The $1^{st}$ phase response of the cats to the 3 diets was that the high protein was preferred (mean intake 41 g) over the intermediate and high carbohydrate diets (mean intake 22.7 g & 5.1 g respectively). It should be noted however, that the intake of intermediate was higher than high protein on day 1 and they were the same on day 4.

The experienced response of the cats to the 3 diets was very similar to that seen during the naïve self-selection. High protein diet was preferred (mean intake 49.7 g) to the high carbohydrate and intermediate (mean intakes 2.9 g and 21.6 g respectively). As in the naïve phase it should be noted however, that the intake of intermediate and high protein on day 1 were similar and again on day 4.

Investigation of the mean proportion energy intakes of protein and carbohydrate (PER/CER) showed cats consumed 28.8% PER, 21.6% CER in the naïve self-selection phase. The same analysis of PER/CER during the experienced self-selection showed the mean proportion of macro-nutrients consumed to be 32.1% PER, 22.8% CER in the experienced self-selection phase.

In summary, the high protein diet appeared to be hedonically more palatable than the high carbohydrate and intermediate diets during both the naïve and the experienced self-selection.

This indicates that the macronutrient profile of the high protein diet (51% PER, 24% FER, 25% CER) is preferred to both the intermediate (37% PER, 23% FER, 40% CER) and high carbohydrate (26% PER, 21% FER, 53% CER) diets. However, during the monadic learning phase there was little distinction between high protein and intermediate diets. The high carbohydrate was still rejected.

Introduction

The aim of this study was to assess diets with similar fat energy ratios (FER) but variable carbohydrate and protein energy ratios. One diet had a high protein energy ratio (PER), another had a high carbohydrate energy ratio (CER) and a third diet had an intermediate energy ratio of carbohydrate and protein.

Methodology

Animals

Cats (n=12) were selected that had been fed dry kibble diets throughout life, from the weaning.

The cats were housed individually and were socialized as a group every day.

Diets

Three dry kibble diets were fed during the study. The diets were designed to all contain the same level of fat whilst one diet was enriched with carbohydrate, one enriched with protein and a third was the intermediate of the other two diets. Analysis of the diets provided the predicted metabolisable energy (PME) content of each diet, the values of which are shown in Table 1. The protein, carbohydrate and fat content of each diet was analysed and calculated to provide the ratio of each macronutrient relative to the total energy (PME) of each diet i.e. Protein/Fat/Carbohydrate Energy Ratio (P/F/CER in Table 1).

TABLE 1

PME and macronutrient energy ratios for diets

| Diet Code | % expected PER:FER:CER | PME (Kcal/100 g) |
|---|---|---|
| A (High Carbohydrate) | 26/21/53 | 348 |
| B (High Protein) | 51/24/25 | 333 |
| E (Intermediate) | 37/23/24 | 336 |

Feeding Protocols

The feeding protocol used is set out in Example 2.

Bodyweights

Bodyweights were recorded twice weekly and closely monitored to ensure adequate food intakes.

Data Analysis

Is as set out in Example 2.

Results and Data Analysis

Animals

All of the 12 cats completed the study.

The mean percentage change in bodyweight from the start of the trial to the end of the trial was +2.3% averaged over all cats.

FIG. 28 shows the mean intakes throughout the trial.

This chart shows the mean intakes throughout the trial. The 3 phases are identified as:

Naïve=cycles 1 to 7
Learning=cycles 8 to 15
Experienced=cycles 16 to 22.

It is quite clear that the cats having sampled all the diets during the naïve phase of self-selection, rejected the carbohydrate diet. The preferred diet was the high protein in the remaining 2 phases. However in the monadic learning phase the intermediate diet was equally accepted as the high protein.

P/F/CER Selection as a Potential Driver of Macronutrient Selection

The mean PER intake was calculated as set out in Example 2.

Thus the daily/per cycle mean PER/FER/CER intake was calculated. (See table 3)

If random sampling had taken place and thus equal amounts of each diet were eaten, the expected PER/FER/CER would be 38%/23%/39%.

TABLE 3

Mean cycle PER, FER and CER intake for each phase

| | Phase 1 Naïve self-selection | Phase 2 Learning/Monadic | Phase 3 Experienced self-selection |
|---|---|---|---|
| PER (%) | 43.5 | 39.9 | 44.7 |
| FER (%) | 23.6 | 23.9 | 23.5 |
| CER (%) | 32.9 | 36.2 | 31.8 |

Throughout all three phases FER intakes were as would be expected from random sampling.

PER were greater and CER were less than expected if random sampling was taking place.

This indicates that selection was being made rather than random sampling of the diets.

TABLE 4

Mean daily intake (g) of each diet for each phase

| | Phase 1 Naïve self-selection (3 diets offered) | Phase 2 Learning/Monadic (one diet offered) | Phase 3 Experienced self-selection (3 diets offered) |
|---|---|---|---|
| Diet A (High CHO) | 5.1 | 37.9 | 3.9 |
| Diet B (High Protein) | 41.0 | 73.9 | 49.8 |
| Diet E (Intermediate) | 22.7 | 72.1 | 21.9 |

TABLE 5

Mean daily intake (g) of macro-nutrient for each phase

| | Phase 1 Naïve self-selection | Phase 2 Learning/Monadic | | | Phase 3 Experienced self-selection |
|---|---|---|---|---|---|
| | | Diet A | Diet B | Diet E | |
| Protein (g/day) | 28.8 | 9.0 | 27.2 | 34.2 | 32.2 |
| Fat (g/day) | 6.4 | 3.9 | 6.9 | 6.7 | 7.0 |
| CHO (g/day) | 21.6 | 19.2 | 25.3 | 19.9 | 23.0 |

Tables 4 & 5 show the mean intakes in grams of the diets and the macro-nutrients, throughout the three phases of the trial. These also show that the high carbohydrate diet was rejected throughout the trial.

TABLE 6

Proximate dietary analysis and energy ratios

| | Proximate analysis (g or kcal/100 g) | | | | Energy Ratio (%) | | |
|---|---|---|---|---|---|---|---|
| | Protein (g) | Fat (g) | CHO (g) | PME (kcal) | PER | FER | CER |
| Diet A (High CHO) | 23.8 | 10.3 | 50.6 | 348.0 | 26 | 21 | 53 |
| Diet B (High Protein) | 46.3 | 9.0 | 26.9 | 332.7 | 51 | 24 | 25 |
| Diet E (Intermediate) | 37.7 | 9.6 | 35 | 336.1 | 37 | 23 | 40 |

FIG. 29 shows the mean C/PER for each cycle during each phase of the trial. CER was lower than PER through each cycle, in all three phases.

This suggests that the cats identified and rejected the high carbohydrate from the beginning.

Conclusions

Analysis of cycle mean intakes showed that the high protein and intermediate diets were consistently preferred to the high carbohydrate diet. This suggests that selection is taking place and not a random sampling.

The high protein diet appeared to be hedonically more palatable than the high carbohydrate and intermediate diets during both the naïve and the experienced self-selection.

Mean cycle food intakes indicate that the macronutrient profile of the high protein diet (51% PER, 24% FER, 25% CER) is preferred to both the intermediate (37% PER, 23% FER, 40% CER) and high carbohydrate (26% PER, 21% FER, 53% CER) diets during naïve and experienced self selection phases. However, during the monadic learning phase there was little distinction between high protein and intermediate diets. The high carbohydrate was rejected throughout all three phases.

The high carbohydrate diet (CER 53%) had a PER of 26% but was still rejected over the other two diets. As the FER was similar for all three diets, it would indicate that the cats are making selection based on PER.

Analysis of feeding patterns in phase I the intake for high protein (diet B) is most preferred, followed by intermediate (diet E). The high carbohydrate diet is consistently rejected throughout the day.

In phase 2 when the cats have no choice, they will eat all the diets but the preference is fluctuating between high protein and intermediate diets, although at the time-slots 5 pm-1 am there is almost parity across the 3 diets.

In phase 3 the high protein diet is clearly preferred to the other two diets.

The highest mean intakes are between 9 am and 5 pm, presumably stimulated by outside influences of the working day.

Example 6

Regulation of Macronutrient Intake in Dogs

This example summarises the preliminary feeding data from the two dog macronutrients studies. They are 1) Effect of macronutrient profile on the long-term acceptance of dry dog food in Cocker Spaniels and Miniature Schnauzers and 2) Effect of macronutrient profile on the long-term preference of dry dog food in Labradors at different lifestages.

Rationale

A project investigating the effect of macronutrient profile on the long-term acceptance of food in cats has been completed. Studies have investigated the long term feeding responses of cats to diets with varying amounts of protein, carbohydrate or fat. These trials have employed a specific methodology developed to investigate the cats ability to learn post-ingestive nutritional consequences of any diet consumed. Through these studies it has been identified that cats, when allowed free choice between diets of different macronutrient compositions, have the ability to change their diet preferences in order to achieve a target macronutrient intake. It has also been noted that there are limits to the amount of carbohydrate and fat that cats are willing to consume over a 24-hour period.

A project investigating the effect of macronutrient profile on the long-term acceptance of food in dogs has now been completed. The objective of this project is to determine if, over an extended feeding period, dogs regulate their intake of individual macronutrients, and includes:

Development of relevant methodology/protocols.
Investigation of specific dog breeds (e.g., Cocker Spaniel, Labrador, and St. Bernard).
Investigation of different dog sizes (e.g., toy, small, medium, large, and giant).
Investigation of different lifestages (e.g., puppy, adult, and senior).

The studies described examine the effect of macronutrient profile on the long-term acceptance of food in dogs. These studies had several objectives, including:

Development of relevant methodology/protocols for use with dogs.
Determining if dogs are able to regulate their intake of individual macronutrients.
Determining if dogs are able to regulate their intake of calories.

Animals 24 adult dogs (12 Miniature Schnauzers [small breed] and 12 Cocker Spaniels [medium breed]) were included in the trial. All dogs had been exposed to dry diets previously and are naïve to the experimental diets at the commencement of this study. Dogs were randomised into diet rotation groups during the Learning/Monadic phase of the trial.

Diets

The prefeed stage involved feeding only one diet to the animals. Subsequent stages involved feeding three dry diets specifically formulated to have a high protein-, fat-, or carbohydrate energy ratio as listed in Table 1, below:

TABLE 1

Actual analytical dietary energy ratios and energy contents.

| Diet Code | Diet Type | Actual PER/FER/CER (%) | Energy (Kcal/ 100 g) |
| --- | --- | --- | --- |
| Prefeed | PED. Adv. Adult - Mini | 26:34:40 | 375 |
| A | High carbohydrate | 30:16:54 | 334 |
| B | High protein | 52:24:24 | 344 |
| C | High fat | 21:52:27 | 447 |

All diets have been formulated to be nutritionally complete and within Waltham Centre for Pet Nutrition (WCPN) minimum dog adult maintenance guidelines for protein (16.0 g/400 kcal) and fat (5.5 g/400 kcal) content.

Protocol

The study was composed of five phases:

Phase 1: Prefeed (35 days). The dogs were offered the prefeed dry diet at 100% of their daily calorie requirement for 14 days. The amount was then increased to 200% daily calorie requirement for 21 days. The prefeed phase was designed to acclimatize the dogs to the study feeding regime (am and pm feeding) and also to being offered food in excess of their daily calorie requirement.

Phase 2. Naïve Self-Selection (7 days). The dogs were offered three dry diets of different macronutrient ratio simultaneously each at 100% of their daily calorie requirement (300% total daily calorie requirement available).

Phase 3: Learning/Monadic (24 days). The dogs were offered each diet at 100% of their daily calorie requirement individually over a 3 day cycle. Each cycle will be repeated 8 times during this 24 day learning phase.

Phase 4: Experienced Self-Selection 1 (7 days). The dogs were again offered three dry diets of different macronutrient ratio simultaneously each at 100% of their daily calorie requirement (300% total daily calorie requirement available).

Phase 5: Experienced Self-Selection II (4 days). The dogs were offered three dry diets of different macronutrient ratio simultaneously each at 200% of their daily calorie requirement (600% total daily calorie requirement available). The study was extended to include the Experienced Self-Selection II phase as it was noticed some of the dogs were eating all of the high fat diet being offered in Experienced Self-Selection I phase. The amount of each diet offered was increased to 200% daily calorie requirement.

NOTE: Daily calorie requirement calculated using WCPN recommendation of 110 kcal/kg$^{0.75}$.

Results

Data for the trial is presented in FIG. 30 (Miniature Schnauzers) and 31 (Cocker Spaniels). There was evidence of nutritional learning during the monadic phase where the preference for the high fat diet increased as the learning phase progressed. This was especially evident for the Miniature Schnauzers. The preference for the high fat diet was higher, therefore, in the experienced self-selection phase I compared to the naïve self-selection phase. Indeed, it was noted that some of the dogs were eating all of the fat diet being offered in experienced self-selection phase I, so it was decided to double the amount of each of the three diets for an addition four days. It can be seen in the experienced self-selection phase II that intake of the high fat diet increased further, which was offset by a corresponding decrease in the intake of the high protein diet. The high fat diet was, therefore, significantly preferred over the high protein and high carbohydrate diets in this phase. Intake of the high carbohydrate diet was lower than the intakes of either of the high protein and fat diets in all phases of the trail.

Animals

18 Labradors (6 puppies, 6 adults, and 6 seniors) were included in the trial. All dogs had been exposed to dry diets previously and are naïve to the experimental diets at the commencement of this study. Dogs were randomised into diet rotation groups during the Learning/Monadic phase of the trial.

Diets

The same batch of diets used in the previous trial (directly above) were also used in this trial, with an alternate prefeed.

Protocol

A modified trial protocol was used to take into account that Labradors as a breed are perceived as being over-eaters. To prevent potential weight gain, the maximum intake of the dogs was restricted in the naïve and experienced self-selection phases to about 110%, after which the diets were removed. The order in which the dogs ate each diet was also recorded. The reason the dogs were allowed to eat about 110% of their daily calorie requirement was to determine what the second diet of choice was if any dog went immediately to one bowl and ate all of one diet. The prefeed phase was critical in acclimatizing the dogs to the trial feeding regime and also to accept food being removed in the naïve and experienced self-selection phases.

The study was composed of four phases:

Phase 1: Prefeed (7 days). The dogs will be offered the prefeed dry diet at 100% of their daily calorie requirement.

Phase 2: Naïve self-selection (7 days). The Labradors will be offered all three diets simultaneously each at 100% of their daily calorie requirement. After the dogs have eaten about 110% of their daily calorie requirement, the remaining diets are removed.

Phase 3: Learning/monadic (15 days). The dogs will be offered each diet at 100% of their daily calorie requirement individually over a 3 day cycle. Each cycle will be repeated 5 times during this 15 day learning phase. Note that this phase has been reduced by 9 days (3 cycles) compared to the trial above, where it appeared that 5 cycles was sufficient for the dogs to learn about the diets offered.

Phase 4: Experienced self-selection (7 days). The Labradors will be offered all three diets simultaneously each at 100% of their daily calorie requirement. After the dogs have eaten about 110% of their daily calorie requirement, the remaining diets are removed.

NOTE: Daily calorie requirement calculated using WCPN recommendation of 110 kcal/kg$^{0.75}$.

Results

Data on the percentage of daily energy requirement consumed for each diet is presented in FIGS. 32 (Labrador—puppy), 33 (Labrador—adult), and 34 (Labrador—senior). The results were similar to those obtained for the previous trial on small (Miniature Schnauzers) and medium (Cocker Spaniels) dogs. There was a significant preference for the high fat diet over the high protein and high carbohydrate diets for all lifestages. The preference for the high fat diet started from the onset of the naïve self-selection phase, but became more pronounced in the experienced self-selection phase. For the puppy group, there was no difference between the high protein diet and the high carbohydrate diet, while both the adult and senior groups preferred the high protein diet over the high carbohydrate diet. It is important to note that there was also evidence of the dogs regulating their calorie intake during the learning/monadic phase of the trial, where average intakes for the high protein and high carbohydrate diets were less than 100%.

Conclusions

Methodology/protocols have been successfully developed for studying the effect of dietary macronutrients on food selection in dogs.

An important part of the dog study protocol involves a prefeed phase to acclimatize the dogs to the study feeding regime (am and pm feeding, excess food), which is different to the protocol used with cats.

It has been shown that when subjected to the appropriate feeding regime/protocol, dogs are able to regulate both their calorie and macronutrient intake.

The trials completed on dry food have found that the dog breeds studied thus far (Miniature Schnauzers, Cocker Spaniels, and Labradors) exhibit a similar and significant preference for a high fat diet (high fat>high protein>high carbohydrate).

Example 7

Regulation of Macronutrient Intake in Cats

Rationale

A series of trials have been carried out investigating the long term feeding responses of cats to the macronutrient profile of wet diets. Results from these trials identified that adult cats have a target or preferred macronutrient intake. Based on this information, a canned catfood (meaty chunks in jelly) product was formulated to fall within the target macronutrient intake range for adult cats and these trials compared the feeding performance of this product with novel human foods; namely freshly roasted chicken breast and canned cod fillet. Each of these human foods were chosen as they are commonly believed to be highly palatable to cats and also have a higher PER than the product formulated to fall within the target macronutrient range. We hypothesized that, after an appropriate period of learning, cats would display a preference for the product formulated to fall within the target macronutrient range over the foods offered to them that do not satisfy their target macronutrient intake despite the perceived hedonic attraction of those foods. The cats (n=12 per study) were fed using an established methodology developed for investigating long term feeding responses.

Diets

The first diet (A) was freshly roasted chicken breast. The chicken breasts were roasted with the skin on but the skin was removed prior to feeding. The second diet (B) was canned cod fillet. This was cubed pieces of cod. The third diet (W) was a canned catfood formulated using a meaty chunks in jelly recipe to contain a PER/FER and CER within the currently accepted target range for adult cats. Further details of the diets are listed in the following table:

| Diet Code | Diet Type | Protein/Fat/CHO Energy Ratios (PER/FER/CER) |
|---|---|---|
| A | Fresh Roast Chicken | 82/18/0 |
| B | Canned Cod Fillet | 92/8/0 |
| W | CIJ recipe at 55% PER | 53/43/4 |

Feeding Protocol

The feeding protocol for each study consisted of 3 different feeding regimes: an initial self-selection phase (7 days), a monadic phase (16 days) and a final self-selection phase. During the self-selection phases (naïve and experienced), the cats had ad libitum access to both experimental diets for approximately 22 hours per day. During the monadic phase, the cats each received ad libitum access to a single test diet for approximately 22 hours each day. To avoid positional bias the diets were rotated daily.

Results

Effect of Macronutrient profile on diet selection in cats; Fresh Roast Chicken vs. canned catfood (meaty chunks in jelly) recipe within target macronutrient range Throughout all phases of the trial, cats displayed a preference (measured as amount eaten in g/day) for the canned catfood (meaty chunks in jelly) diet formulated to be within the target macronutrient range for adult cats over the roast chicken. However this preference was markedly more pronounced in the experienced self-selection phase compared with the naïve self-selection phase (see FIG. 35) where cats ate approximately two and a half times of the canned catfood (meaty chunks in jelly) than of the roast chicken. This is also demonstrated in FIG. 36. During the naïve self-selection phase, on average, 37% of the total daily intake was roast chicken and 63% was the canned catfood (meaty chunks in jelly) diet. During the experienced self-selection phase the proportion of the total daily intake of the canned catfood (meaty chunks in jelly) diet increased to 70% and that of the roast chicken decreased to 30%.

During the naive self-selection phase, 8 out of the 12 cats showed an individual preference (greater than 60:40 ratio) for the canned catfood (meaty chunks in jelly) diet formulated to be within the target macronutrient range for adult cats over the roast chicken. Two out of the 12 cats showed a preference for the roast chicken and the two remaining cats showed no distinct preference for either diet in this phase. During the monadic phase, 5 out of the 12 cats showed a preference for the canned catfood (meaty chunks in jelly) diet formulated to be within the target macronutrient range for adult cats over the roast chicken. The remaining 7 cats showed no preference for either diet in this phase. During the experienced self-selection phase, 10 out of the 12 cats showed an individual preference for the canned catfood (meaty chunks in jelly) diet formulated to be within the target macronutrient range for adult cats over the roast chicken (see FIG. 37). The two remaining cats showed no distinct preference for either diet in this phase. None of the cats showed a preference for the roast chicken in this phase.

Effect of Macronutrient profile on diet selection in cats; Canned Cod vs. canned catfood (meaty chunks in jelly) recipe within target macronutrient range Cats displayed no preference for either diet (amounts eaten being approximately the same) during the naïve self-selection phase (see FIG. 38). During the monadic phase, intake of the canned catfood (meaty chunks in jelly) diet was slightly higher than that of the cod fillet. Importantly, during the experienced self-selection phase, intakes of the canned catfood (meaty chunks in jelly) diet were one and a half times higher than that of the cod fillet. This is also demonstrated in FIG. 39. During the naïve self-selection phase, on average, 51% of the total daily intake was cod fillet and 49% was the canned catfood (meaty chunks in jelly) diet. During the experienced self-selection phase the proportion of the total daily intake of the canned catfood (meaty chunks in jelly) diet increased to 61% and that of the cod fillet decreased to 39%.

During the naive self-selection phase, 3 out of the 12 cats showed an individual preference (greater than 60:40 ratio) for the canned catfood (meaty chunks in jelly) diet formulated to be within the target macronutrient range for adult cats over the cod fillet. Four out of the 12 cats showed a preference for the cod fillet and the five remaining cats showed no distinct preference for either diet in this phase. During the monadic phase, 1 out of the 12 cats showed a slight preference for the canned catfood (meaty chunks in jelly) diet formulated to be within the target macronutrient range for adult cats over the cod fillet and 1 out of the 12 cats showed a slight preference for the cod fillet. The remaining ten cats showed no preference for either diet in this phase. During the experienced self-selection phase, 7 out of the 12 cats showed an individual preference for the canned catfood (meaty chunks in jelly) diet formulated to be within the target macronutrient range for adult cats over the cod fillet (see FIG. 40). The five remaining cats showed no distinct preference for either diet in this phase. None of the cats showed a preference for the cod fillet in this phase.

Conclusions

After an appropriate period of learning, the majority of cats showed a preference for the canned catfood (meaty chunks in jelly) diet formulated to be within the target macronutrient range for adult cats over the roast chicken or the cod fillet, both of which were outside of the target macronutrient range.

During the experienced self-selection phase, intakes of the canned catfood (meaty chunks in jelly) diet were two and a half times higher than that of the roast chicken.

During the experienced self-selection phase, intakes of the canned catfood (meaty chunks in jelly) diet were one and a half times higher than that of the cod fillet.

On average, during the experienced self-selection phase, the proportion of the total daily intake was 70:30 canned catfood (meaty chunks in jelly) to roast chicken and 61:39 canned catfood (meaty chunks in jelly) to cod fillet.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method for determining the optimum macronutrient content of a diet for an individual companion animal, the method comprising the steps of:
   providing, over an extended and preselected period of time, different food compositions to said animal in which each composition provides an enriched source of fat, protein or carbohydrate, such that said animal can select and consume different and preferred quantities of each said food compositions in order to achieve an optimum consumption of fat, protein and carbohydrate for said animal;
   allowing said animal to consume the different and preferred quantities of fat, protein and carbohydrate from each of said compositions over the extended preselected period of time; and
   determining, from the consumed amount of fat, protein and carbohydrate from each of said compositions, a customized dietary regime that provides the optimum macronutrient content of a diet for said individual animal.

2. The method, as claimed in claim 1, wherein the compositions which provide an enriched source of fat, protein or carbohydrate are dried, wet or semi-moist food products.

3. The method, as claimed in claim 1, wherein the extended and preselected period of time includes a learning phase of a period of 3 days, or more.

4. The method, as claimed in claim 1, wherein the source of fat comprises from 50 to 75% fat on a fat:energy ratio.

5. The method, as claimed in claim 1, wherein the source of protein comprises from 50 to 75% protein on a protein:energy ratio.

6. The method, as claimed in claim 1, wherein the source of carbohydrate comprises from 25 to 50% carbohydrate on a carbohydrate:energy ratio.

7. The method as claimed in claim 1, wherein the companion animal is a cat, dog, horse, fish or bird.

* * * * *